(12) United States Patent
Gonzalez et al.

(10) Patent No.: US 9,003,512 B2
(45) Date of Patent: Apr. 7, 2015

(54) CONTENT PROTECTION MANAGEMENT SYSTEM

(75) Inventors: Francisco Gonzalez, Atlanta, GA (US); Edgar V. Shrum, Jr., Smyrna, GA (US)

(73) Assignee: Cox Communications, Inc., Atlanta, GA (US)

( * ) Notice: Subject to any disclaimer, the term of this patent is extended or adjusted under 35 U.S.C. 154(b) by 1072 days.

(21) Appl. No.: 12/839,832

(22) Filed: Jul. 20, 2010

(65) Prior Publication Data

US 2010/0287609 A1    Nov. 11, 2010

Related U.S. Application Data

(63) Continuation of application No. 12/688,609, filed on Jan. 15, 2010, now abandoned.

(60) Provisional application No. 61/145,164, filed on Jan. 16, 2009.

(51) Int. Cl.
| | |
|---|---|
| *G06F 9/00* | (2006.01) |
| *G06F 15/16* | (2006.01) |
| *G06F 12/00* | (2006.01) |
| *H04L 29/06* | (2006.01) |
| *G06F 21/10* | (2013.01) |
| *H04N 21/418* | (2011.01) |
| *H04N 21/436* | (2011.01) |
| *H04N 21/4367* | (2011.01) |
| *H04N 21/4623* | (2011.01) |
| *H04N 21/4627* | (2011.01) |
| *H04N 21/643* | (2011.01) |
| *H04N 21/8355* | (2011.01) |

(52) U.S. Cl.
CPC ............ *H04L 63/0823* (2013.01); *G06F 21/10* (2013.01); *H04L 63/10* (2013.01); *H04N 21/4181* (2013.01); *H04N 21/43615* (2013.01); *H04N 21/4367* (2013.01); *H04N 21/4623* (2013.01); *H04N 21/4627* (2013.01); *H04N 21/64322* (2013.01); *H04N 21/8355* (2013.01); *H04L 2463/101* (2013.01)

(58) Field of Classification Search
CPC ........... A01B 12/006; H04L 2463/101; H04N 21/8355; H04N 21/64322
USPC .......................................................... 726/14
See application file for complete search history.

(56) References Cited

U.S. PATENT DOCUMENTS

| | | |
|---|---|---|
| 7,934,263 B2 | 4/2011 | Singer et al. |
| 8,413,256 B2 | 4/2013 | Gonzalez et al. |
| 2004/0187014 A1 | 9/2004 | Molaro |
| 2006/0156416 A1 | 7/2006 | Huotari et al. |
| 2006/0161895 A1* | 7/2006 | Speeter et al. ................ 717/121 |

(Continued)

OTHER PUBLICATIONS

Bogdan C. Popescu; A DRM Security Architecture for Home Networks; Year: 2004; Vrije Universiteit Amsterdam The Netherlands; pp. 1-10.*

*Primary Examiner* — Monjour Rahim
(74) *Attorney, Agent, or Firm* — Merchant & Gould P.C.

(57) ABSTRACT

A content protection management system that enables interoperability with other Content Protection and DRM technologies. A managed security domain provides a simple, consistent and reliable experience to whole-home network subscribers. The architectural concept for the whole-home network includes an underlying control plane with an overlaying content security control plane running a particular DRM technology.

19 Claims, 16 Drawing Sheets

(56) References Cited

U.S. PATENT DOCUMENTS

| | | | |
|---|---|---|---|
| 2007/0168665 A1* | 7/2007 | Kim et al. | 713/171 |
| 2007/0180497 A1* | 8/2007 | Popescu et al. | 726/4 |
| 2008/0052388 A1* | 2/2008 | Korkishko et al. | 709/223 |
| 2008/0118230 A1* | 5/2008 | Kirsche | 386/124 |
| 2008/0120675 A1 | 5/2008 | Morad et al. | |
| 2008/0209318 A1* | 8/2008 | Allsop et al. | 715/700 |
| 2008/0244676 A1* | 10/2008 | DaCosta | 725/116 |
| 2008/0249946 A1* | 10/2008 | Candelore | 705/59 |
| 2009/0248848 A1* | 10/2009 | Jeong et al. | 709/223 |
| 2009/0293131 A1* | 11/2009 | Pak et al. | 726/26 |
| 2009/0300724 A1 | 12/2009 | Cho et al. | |

* cited by examiner

CONTENT PROTECTION MANAGEMENT SYSTEM

RELATED APPLICATIONS

This application is a continuation of U.S. application Ser. No. 12/688,609, filed on Jan. 15, 2010, entitled "Content Protection Management System," and claims the benefit of U.S. Provisional Application, Ser. No. 61/145,164, filed on Jan. 16, 2009, entitled "Content Protection Management System," which are both incorporated herein by reference.

FIELD OF THE INVENTION

This disclosure relates in general to content protection systems, and more particularly to a content protection management system that enables interoperability with other Content Protection and DRM technologies.

BACKGROUND

DRM is the enabling technology behind new business models based on content delivery to devices—any content, to any device, any time, anywhere, anyhow, with advertising. Its functionality is just as important as the user interface and program guide in influencing what can be done with content, and is thus a major factor in influencing the user experience. DRM technology solution must be configured to enable the business to meet the strategic priorities of the organization. For example, one priority is product usability, which should be recognized for its simplicity and consistency. CPMS should enable ease of use of content across platforms. CPMS should also facilitate wireless growth so that DRM is provided for video to mobile devices. DRM must also meet major market product deployment and enhancements within a short response time.

There are also many additional drivers for DRM. For example, a Video 2 PC product requires the use of DRM to provide typical conditional access functions as well as more robust content usage rules. Enhancements to a multi-room DVR product should enable other (non-STB) devices, such as PCs and PMDs, on the home network to view content. DRM should also support the broader and longer term deployment of IPTV class devices, i.e. with no CableCARD™, in the managed home network for a significant whole-home CPE cost reduction. Looking ahead to the converged CPE and home networking architectures, terminating conditional access at a single multi-stream CableCARD™ in the IP Services Gateway, and delivering video over IP over MoCA to tunerless, unrestricted IPTV class clients running CPMS is expected to result in significant cost savings.

Accordingly, a CPMS solution that is simple, reliable, and consistent and that can be deployed across any headend infrastructure is needed. However, divergent product specific DRM technologies should not be deployed that introduce artificial silos of content control. However, a common DRM technology for all telecommunication companies/content providers, such as cable companies and satellite television companies, is not practical for a number of divergent business reasons, including time to market, divergent market drivers, etc. One content provider may decide to expedite wireless services while others may not. Thus, a common DRM vendor may be hard pressed to meet diverging requirements in a timely fashion. Further, the DRM system technology used by future business partners cannot be predicted. The choices for DRM by consumer electronics firms are mainly business driven for competitive positioning. Thus, DRM vendors do not have a logical reason to interoperate.

DRM technology selection is going to be driven by a number of factors which are not likely to be common between different companies. There are many DRM System technologies. As a result, internal security experts may differ regarding the specific technology implementations for encryption, key management, right expression languages, processes like authentication and revocation, and tools like selectable output control and watermarking An advantage is provided if a content provider can focus on a specific direction without being impacted by other business priorities and technology preferences.

Another reason for divergence in DRM technology is the interface to the Back Office and Provisioning Systems. All providers have drastically different back office implementations. Extensive customizations in the form of adapters would have to be developed by the DRM vendor to interface to all the different back offices.

Thus, there is a need for a content protection management system that enables interoperability with other Content Protection and DRM technologies.

SUMMARY OF THE INVENTION

To overcome the limitations described above, and to overcome other limitations that will become apparent upon reading and understanding the present specification, embodiments for providing a content protection management system that enables interoperability with other Content Protection and DRM technologies are disclosed.

The above-described problems are solved by a managed security domain that provides a simple, consistent and reliable experience to whole-home network subscribers. The architectural concept for the whole-home network consist of two main elements (1) an underlying control plane, implemented as part of the CableLabs Reserved Service Domain (RSD) with (2) an overlaying content security control plane running a particular DRM technology.

An embodiment includes a system that provides content delivery to devices over a managed multimedia home network. The system includes a domain manager for receiving content, wherein the domain manager includes a cable card, conditional access component and a security application and a managed client device, coupled to and registered with the domain manager, the managed client device running a security application, the managed client device communicates with the security application in the domain manager, wherein the security application of the domain manager and the security application of the managed client instantiate device authentication and content usage rules as an overlay on top of any other content protection scheme.

In another embodiment, a method for providing content delivery to devices over a managed multimedia home network is disclosed. The method includes receiving content at a domain manager, wherein the domain manager includes a cable card, conditional access component and a security application, requesting content from the domain manager by a managed client device that is coupled to and registered with the domain manager, wherein the managed client device runs a security application, the managed client device communicates with the security application in the domain manager and instantiating device authentication and content usage rules as an overlay on top of any other content protection using the security application of the domain manager and the security DRM application client of the managed client.

A computer readable medium including executable instructions which, when executed by a processor, provides content delivery to devices over a managed multimedia home network is disclosed. The computer readable medium includes instructions executable by the processor to cause the processor to receive content at a domain manager, wherein the domain manager includes a cable card, conditional access component and a security application, to request content from the domain manager by a managed client device that is coupled to and registered with the domain manager, wherein the managed client device runs a security application, the managed client device communicates with the security application in the domain manager and to instantiate device authentication and content usage rules as an overlay on top of any other content protection using the security application of the domain manager and the security DRM application client of the managed client.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to a content protection management system that enables interoperability with other Content Protection and DRM technologies. A managed security domain provides a simple, consistent and reliable experience to whole-home network subscribers. The architectural concept for the whole-home network consist of two main elements (1) an underlying control plane with (2) an overlaying content security control plane running a particular DRM technology.

This combination should result in a solution that interoperates, in terms of content protection and metadata mapping, with other Content Protection and DRM technologies, e.g. Apple's FairPlay, Microsoft WMDRM, Intel's DTCP/IP, and the wireless OMA DRM.

Figure 1:
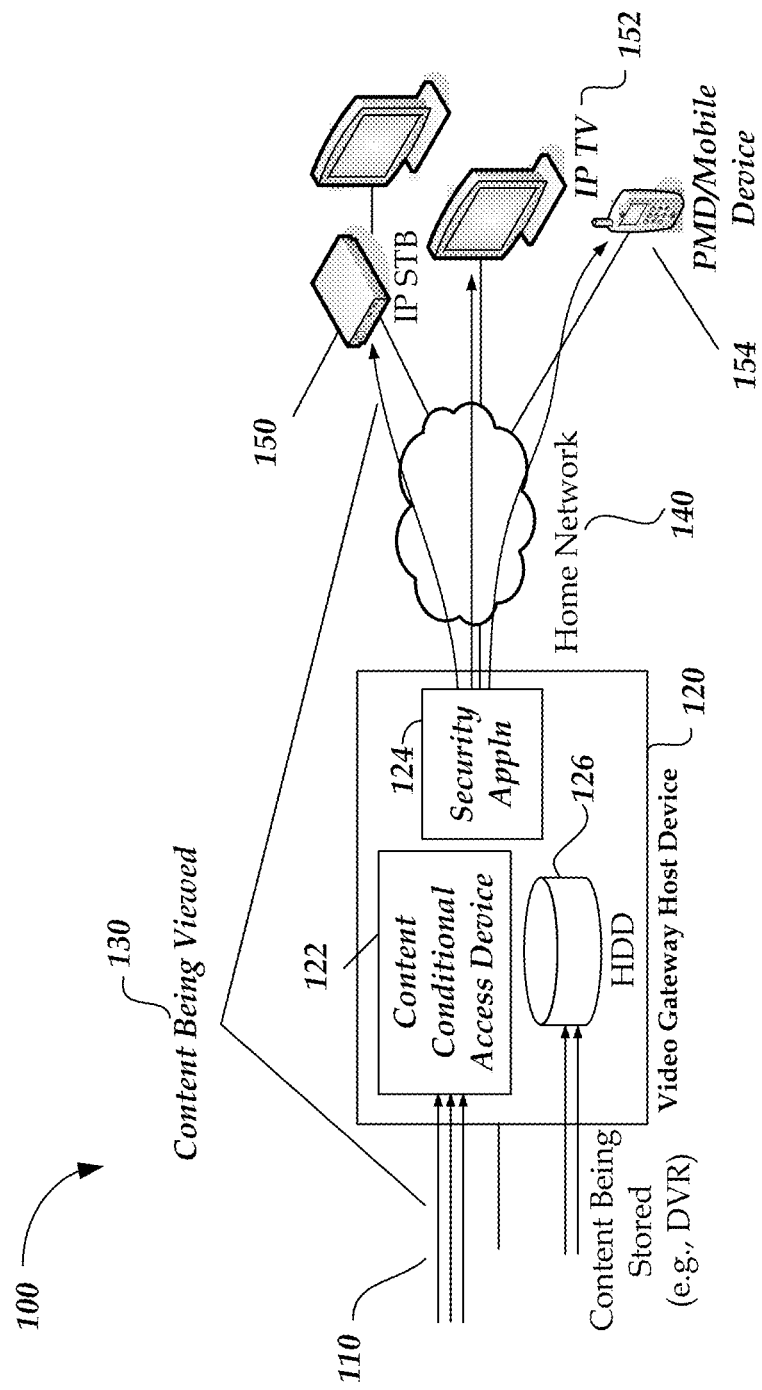
FIG. 1 illustrates a high level home gateway architecture according to an embodiment of the invention.

FIG. 1 illustrates a high level home gateway architecture 100 according to an embodiment of the invention. In FIG. 1, content 110 is received at a video gateway host device 120. The video gateway host device 120 includes a content conditional access (CA) device 122 and a security application 124. The security application 124 may be an MSO security application. In describing embodiments herein, a cable television company will often be used as an example. However, those skilled in the art will recognize that the invention is not meant to be limited to cable operators, but may include other types of telecommunications service companies, such as satellite television operators, cellular carriers, etc. Thus, content will often be distinguished as being managed content, i.e., content that access is limited by a Content Protection Management System (CPMS) plane as described below, and non-managed content.

The basic content protection aspect of a video gateway host device 120 is the fact that it terminates the conditional access component with a single card in the home, thereby enabling the distribution of content to IP terminals using content protection mechanisms managed by the content protection management system. At least two gateway options may be implemented. The first gateway option is a video centric device based on a content protection management system platform. The second gateway option is a data centric device with additional video processing capability plus the ability to bridge and manage both video and data networks in the home.

The video gateway host device 120 may include a hard disk drive (HDD) 126 to store content, such as provided by DVRs. One approach to achieve this goal would be through the use of converged CPE and home networking architectures, Conditional access (CA) is terminated at a single content conditional access device 122, e.g., a Multi-Stream Cable-CARD™, in the gateway device 120. Then, video may be distributed over IP over MoCA (Multimedia over Coax Alliance) to tunerless, unrestricted IPTV class clients running DRM. In FIG. 1, the video being viewed 130 is transmitted through the home network 140 to clients running a basic type of digital rights management (DRM), such as IP set-top box (STB) 150, IP TV 152 and personal media device (PMD)/mobile device 154.

Content protection management system technology in a gateway 120, as shown in FIG. 1, facilitates bridging or interfacing with third party retail CPE running third party content protection management system technologies. The gateway 120 may be implemented to provide a single managed content protection infrastructure with a common set of policies across systems, thereby providing significant gains in operational efficiency.

The security application 124 is configured to work with devices for providing interactive digital cable services delivered over a cable video network, such as Tru2Way devices. The security application 124 takes the output of the content conditional access device 122 and re-encrypts and maps rights into its own security domain. The security application 124 is expected to overlay the residential service domain.

The baseline content protection technology for this domain can be DTCP/IP. OpenCable Application Platform (OCAP) is the Java-based software/middleware portion of the OpenCable initiative and provides an operating system layer designed for consumer electronics that connect to a cable television system. Proprietary messaging control is replaced with a very basic digital transmission content protection (DTCP), which then can be augmented by overlaying a more robust content protection management system. Previously, the middleware ran on a set top box and was disposed between an application and the hardware drivers. The middleware has both a central bus component and headend server components.

Therefore, the security application 124 is expected to be able to interoperate with DTCP. The goals for the security application 124 include providing solutions that are easy to use, result in a reliable and consistent user experience, and provide a robust and manageable security architecture. The security application 124 is also configured to provide a security platform capable of achieving acceptance by major content providers and industry associations. The security application 124 also enables a network operator to manage its own security domain for the multimedia home network and provides a seamless integration with existing back office systems.

Figure 2:
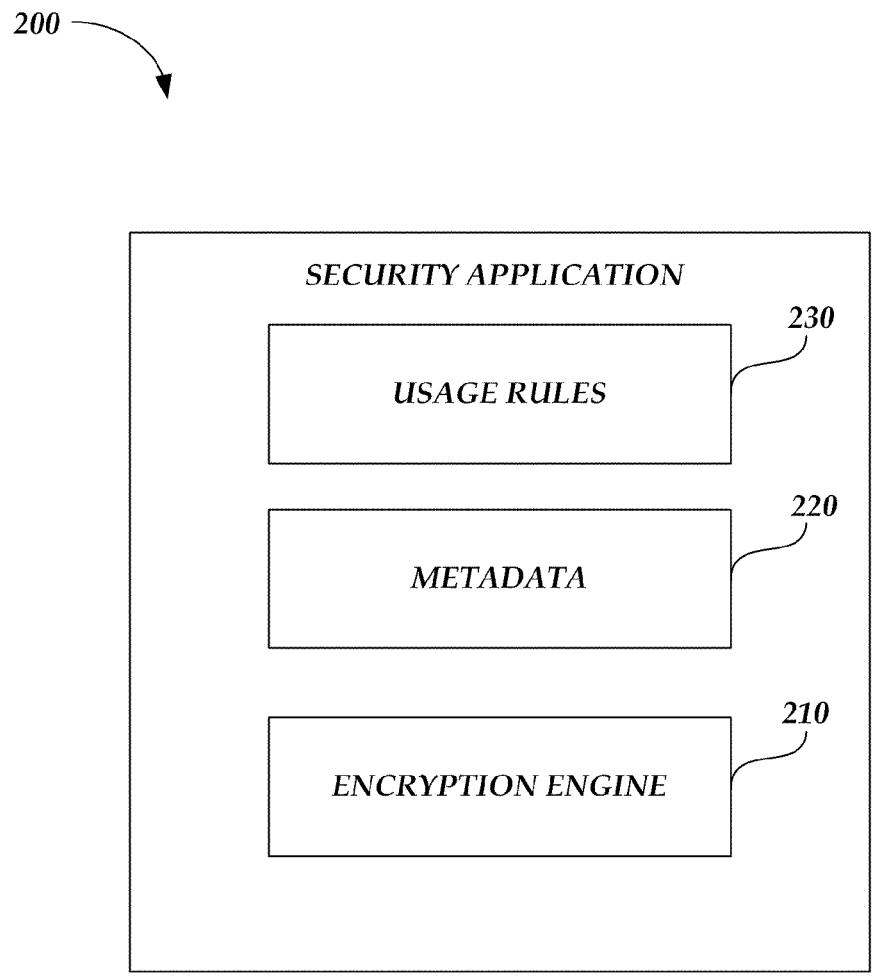
FIG. 2 is a diagram showing components of a security application module according to an embodiment of the invention.

FIG. 2 is a diagram showing components of a security application module 200 according to an embodiment of the invention. In FIG. 2, the security application module 200 has an encryption engine 210, metadata 220 to describe the content and a set of rules 230.

The architectural concept for the whole-home network may, for example, include: (1) an underlying control plane for providing multi-media content, (2) DLNA based device and content discovery, (3) a fundamental content protection technology for the distribution of content within the home, and (4) an overlaying content security control plane. The fundamental content protection technology may be configured to provide a common scrambling and content usage meta-data interface that may be configured to interoperate with other security technologies.

Figure 3:
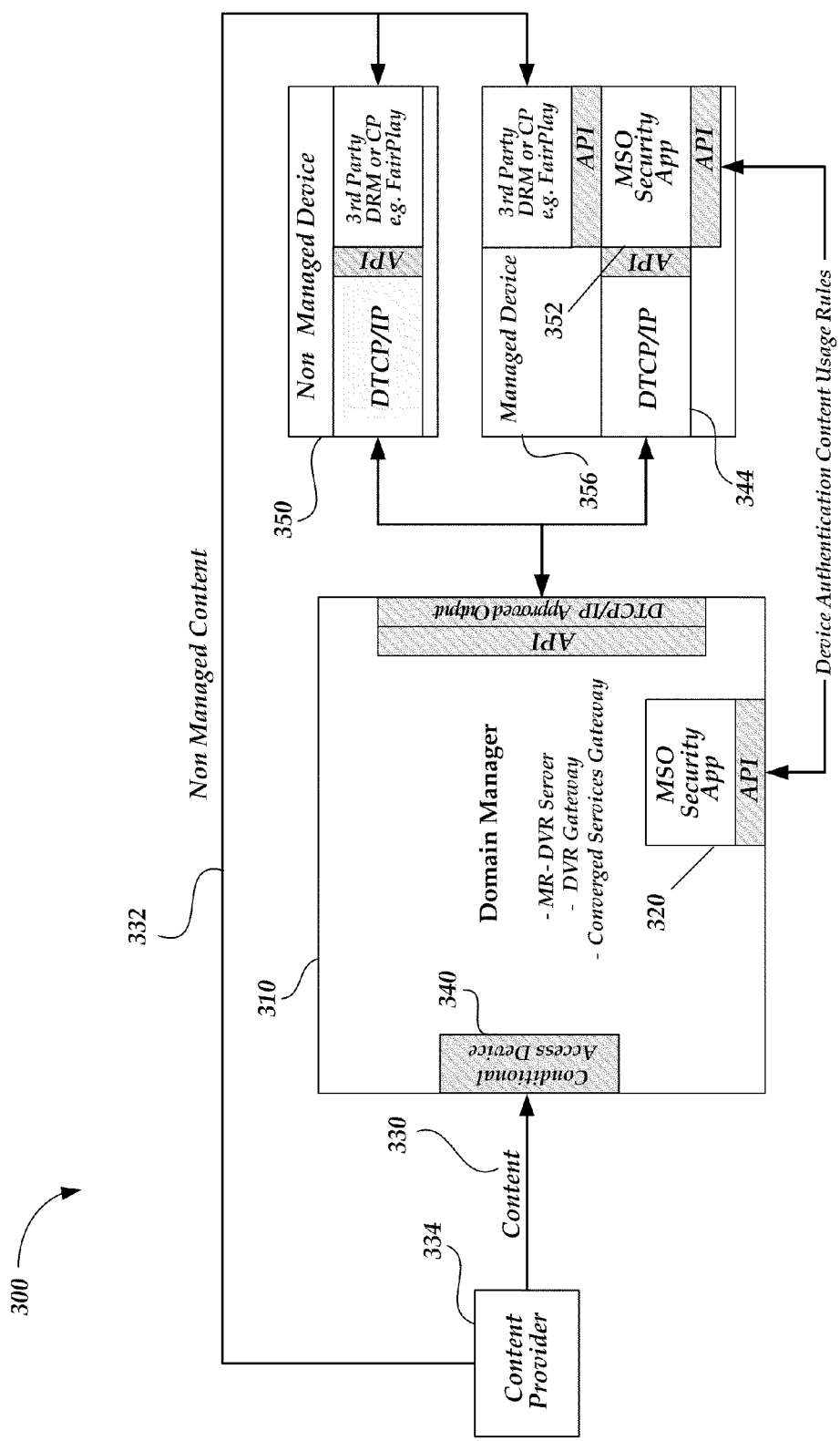
FIG. 3 illustrates a system providing digital rights management according to an embodiment of the invention.

FIG. 3 illustrates a system 300 providing digital rights management according to an embodiment of the invention. In FIG. 3, system 300 terminates the conditional access at the conditional access device 340 to a domain manager 310. The CPMS domain manager 310 includes managed services like Multi-Room DVR and CPE devices like MR-DVR Servers, MR-DVR Clients, DVR Gateways, IP Terminals, Portable Media Devices (PMDs), personal computers, and mobile phones.

The system 300 leverages DTCP as the underlying content protection system. DTCP is a link protection technology protecting content transfer between mutually authenticated, DTLA compliant, source and sink devices. DTCP is licensed by DTLA and uses an enhanced copy control data structure based on the traditional Copy Control Information (CCI) structure. DTCP is also a CableLabs "approved output" technology and widely supported by the content providers.

However, DTCP suffers from two deficiencies that warrant a separate, overlaying control mechanism or plane. Firstly, DTCP does not provide a mechanism that can use to authenticate devices and grant membership to its Trusted Domain or Authorized service Domain. Without this mechanism, it would be impossible to distinguish between retail devices with limited functionality and Tru2Way and leased devices capable of running the user interface. Secondly, the enhanced DTCP messaging data structure is not sufficient to implement sophisticated business models involving a variety of devices with widely different characteristics. System 300 is content and device aware, and possesses knowledge regarding content format and transport as well as device profile and content processing capabilities.

In FIG. 3, the security domain manager 310 may run on the master DVR device and rely on a headend CPMS controller and a security application 320 for implementing the managed control plane over DTCP. The control plane provided by system 300 has two main functions. Firstly it authenticates devices using a new protocol that does not rely on the legacy conditional access systems and does not rely on a CableCARD™. Secondly it implements the content usage rules using extensible rights expression languages.

The system 300 includes four main functional blocks: a content provider 334, a domain manager 310, presumably running the MR-DVR server or DVR Gateway or Converged Services Gateway, a non-managed device 350, and a managed device 356.

The Content Provider 334 is the source of all content. It provides traditional linear and OnDemand content, but also provides content to third party video service providers such as iTunes, some of which deliver their service "over the top." FIG. 3 shows content 330, 332 being received from a content provider 334. Content from a cable provider 330, for example, is received by a conditional access control device interface API 340. Herein, a CableCARD™ will often be used as an illustration of a conditional access control device. However, those skilled in the art will recognize that the invention is not meant to be limited to a particular conditional access control device. Other content 334 may be received by a non-managed device 350.

The non-managed device 350 is a DTLA compliant, DTCP device, which can receive a subset of all services as this device is not authenticated, does not belong to the Trusted or Authorized Service domain and does not use the User Interface. Windows Media DRM is an "approved output" of DTCP, therefore DTLA compliant devices that run WMDRM fall in this category.

The managed device 356 is also a DTLA compliant, DTCP device. However, the managed device 356 also runs a security application 352 and is thus part of the Trusted or Authorized Service domain. The managed device 356 device runs OCAP and is authenticated to the new CPMS controller during provisioning. The managed device 356 is loaded with security application 320, and with the User Interface Application. The managed device 356 may optionally run a third party DRM, as would be the case with a DTLA compliant, DTCP capable, a mobile phone running WMDRM.

The basic content protection aspect of a Home Gateway provided by a domain manager 310 as shown in FIG. 3 is the fact that it terminates the conditional access component with a single media card in the home, enabling the distribution of content to IP terminals using content protection mechanisms managed by system 300. A gateway may be a video centric device based on a DVR platform or a data centric device with additional video processing capability plus the ability to bridge and manage both Video and Data networks in the home.

The DTCP agent 344 in the client communicates with the CPMS security application 352. Restricted content 330 coming from a content provider 334 could be configured with both CCI and CPMS metadata from the system operator. The domain manager 310 may provide the transcription from CCI to CPMS or vice versa. The option is available to perform a direct mapping or an enhanced mapping where content has CCI as well as the additional control that might dictate what can be done with the content. The content goes through the domain manager 310, the client 356 requests the content, there is a negotiation between server source 310 and client 356 at the DTCP level. On top of that, there is also an authentication between the security application 352 of the client 356 and the security application 320 of the server 310. Thus, there might be a lower level of DTCP authentication applications and a higher level authentication between security applications 320, 352. Some content will flow to the non-managed device 350 based strictly on CCI. However, some of the content that flows that way may not be readable because it may be protected additionally by the CPMS plane provided by the device manager 310. For example, metadata may be encrypted so even after DTCP over IP decryption is performed, there is still another layer of encryption that can only be resolved by a CPMS client 356. These parameters may all be set by policy.

Transitioning to content protection and converged services requires a rational phasing strategy leading to content transfer to devices like iPODs and Zunes, and eventually to the development of the full managed converged services network in the home.

Figure 4:
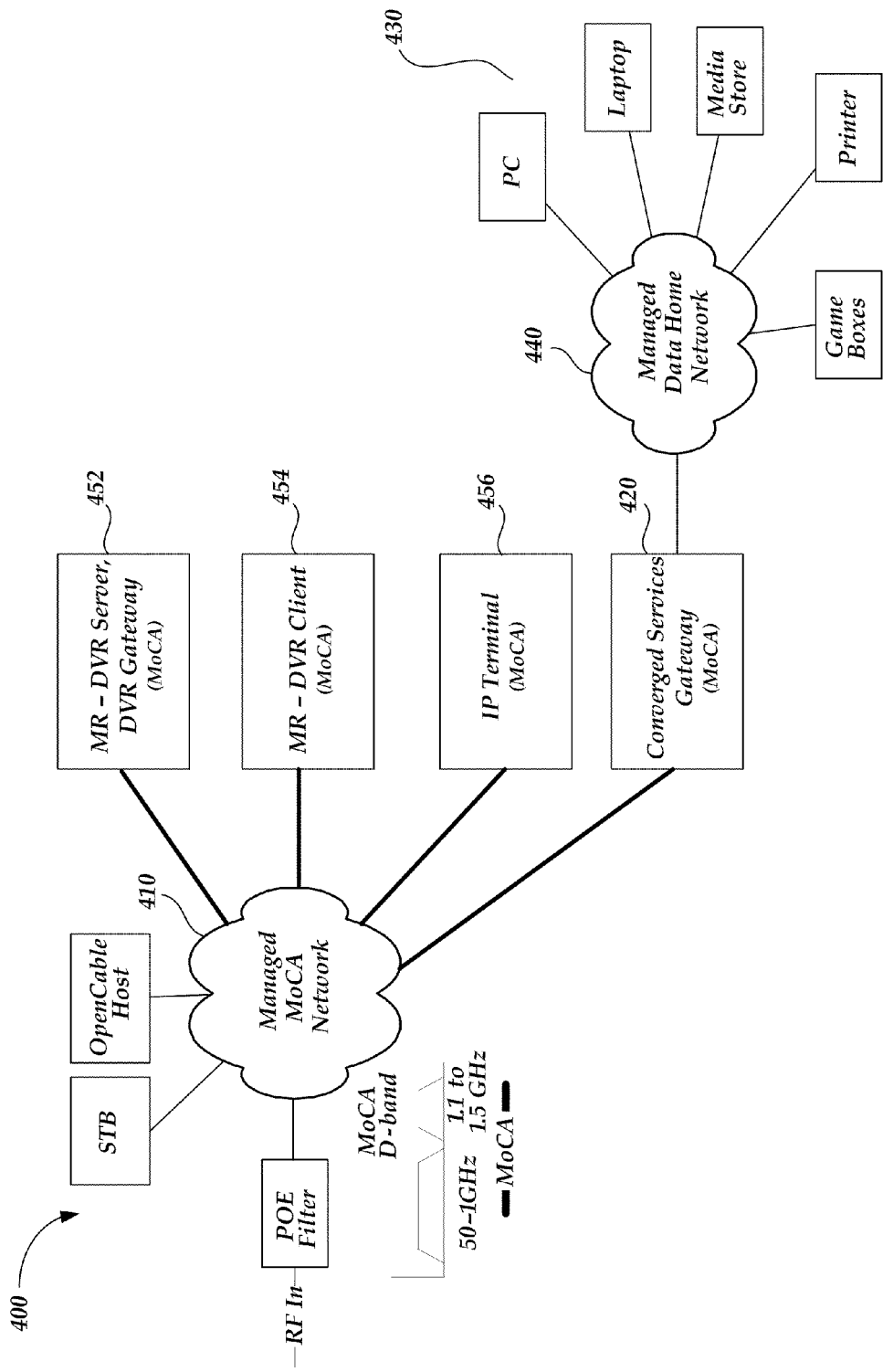
FIG. 4 is a block diagram of the content protection management system transition according to an embodiment of the invention.

FIG. 4 is a block diagram of the content protection management system transition 400 according to an embodiment of the invention. MoCA 410 may be used for interconnecting the video CPE. A bridging function is provided by the Converged Services Gateway 420. The Converged Services Gateway 420 bridges the Video and Data networks with video and data transfer between devices 430 in the managed home network 440. In FIG. 4, a media-centric home network is provided using MoCA technology and basic content protection, e.g., DTCP/IP, to extend the DVR service from a DVR to non-DVR STBs and OpenCable Hosts.

The CPE set includes a MR-DVR Server 452 and a MR-DVR Client 454. Both platforms may be configured to run OCAP, to use conditional access and to enable device provisioning. The MR-DVR Server 452 may be a dual video tuner HD DVR with MoCA, DTCP, transport conversion (IP encapsulation) and home networking support. With the addition of DLNA and UPnP to the platform, the MR-DVR Server 452 may function as the content source for MR-DVR Clients 454.

The MR-DVR Server 452 may be implemented to enable the MR-DVR client devices 454 to view recorded content on the MR-DVR Server 452. The use of OpenCable home networking extensions 2.0 provide a control plane for sharing recorded content. MoCA and conditional access devices provide the home networking technology and link layer protection. The MR-DVR 452 may not be configured with additional tuners to deliver real time services to Client devices 454.

The MR-DVR Client 454 may be configured as a single tuner HD OpenCable Host with MoCA, DTCP, transport conversion (IP encapsulation) and home networking support. The MR-DVR Client 454 may use MoCA and the OpenCable home networking extensions 2.0 to discover, select, and play content stored on a MR-DVR Server and to also schedule recordings.

The embedded cable modem (eCM) in the MR-DVR Server 452 and MR-DVR Client 454 may be configured for DOCSIS command and control. Provisioning for Video/IP delivery or broadband data delivery may not be included.

A next generation User Interface runs on top of an OCAP stack. The MR-DVR Server 452 will typically feature a guide, running on top of an OCAP middleware with DVR and home networking extensions. At a minimum, the guide application needs to consolidate and display the content list being reported by the UPnP content discovery service.

Additionally, the guide application may be configured to communicate with the Reserved Service Domain (RSD) manager to establish connectivity between the DLNA streaming server and clients. The target OCAP stack needs to support the RSD and the OCAP DVR and home networking extensions. The home network extension may be configured to include (1) a DLNA/UPnP media server for streaming recorded and live content to client media players (MR-DVR Client 454, IP Terminal 456 and (2) a DLNA/UPnP media player/renderer for playing restricted and user generated content. A DTCP/IP Manager may be provided as part of the OCAP Home Networking extension.

DTCP features mutual authentication, simple revocation (using system renewability messages or SRMs), Copy Control Information (CCI) metadata, and link level encryption. Planned enhancements to DTCP, adding time duration and counts, position it as a viable content protection mechanism.

Involvement of the CA system in the provisioning of the MR-DVR service is minimized, including device and service provisioning, as well as entitlement configuration. A managed provisioning infrastructure facilitates the migration to IP Terminal devices 456. The MR-DVR may be configured to support the ability to restrict access to recorded content to only controlled/provided devices while also supporting the ability to allow some recorded content to be accessed by other devices with a DTCP-IP input.

A managed security domain is provided via a security application, which is an OCAP privileged application that runs on both the MR-DVR Server 452 and the MR-DVR client 454 and is used by the MR-DVR Server 452 to authenticate clients as belonging to a trusted or authorized service domain. The managed security domain will allow usage rules to be extended beyond DTCP.

Video to devices may be implemented using an MR-DVR Gateway 452, IP Terminals 456, Digital Rights Mapping for PCs and PMDs. Accordingly, content may be transferred to third party devices such as iPODs and Zunes running third party DRM technologies.

Cost may be reduced through the DVR Gateway 452 terminating CA in a single conditional access device for the entire home, and serving content to tunerless IP Terminals. Portable media device from a PC may be connected to the MoCA media network.

The DVR Gateway 452 may be configured as a Video Host Device that is built on a traditional DVR STB platform augmented with additional tuners to deliver real time services to Client Host devices and tunerless IP terminals 456 over MoCA. The DVR Gateway 452 terminates CA in a single conditional access device and uses the OpenCable home networking extensions to share content and resources within the home while leveraging the base security, e.g., DTCP/IP as an approved content protected outlet for digital content. A key capability of the DVR gateway 452 is it ability to perform real time transport conversion (IP encapsulation) of MPEG/QAM delivered content, inclusive of DTCP protected content. The DVR Gateway 452 may also be configured to enable MR-DVR Clients 454 and IP terminals 456 to share recorded content (MR-DVR functionality).

The only input interface to the IP terminal 456 is expected to be MoCA for the reception of video. The IP Terminal 456 may use tuner and DOCSIS resources in the DVR gateway 452 for the reception of video. The DVR gateway 452 will provide the same user interface as a Host device and may therefore support an optimized OCAP stack (IP Device Profile) for running the OCAP guide or a Remote User Interface (RUI).

A USB to WiFi dongle or media extender may be used to provide IP connectivity from the STB to a PC for sideloading a PMD. Note that due to the unmanaged environment of the data network the transfer of file content to a PC may be only on a best effort basis, which is therefore not adequate for streaming. The alternative to this approach would be to enable sideloading directly from a STB. A more extensive Guide, Middleware, and STB development may be implemented to provide this functionality.

Personal computers are leveraged for their side-loading and transcoding functionality. While these functions could be implemented on the STB, the lifecycle of CE devices may outpace the speed of STB development. Thus, faster support for new applications and profiles is more likely on a PC platform. PCs are envisioned to reside on the general purpose data network and be required to run a base security, e.g., DTCP, and/or a security application. The transcoding function converts the source format to formats suitable for PMDs. A dual mode (CDMA-WiFi) handset may be used to run a DTCP client and possibly an authentication application that would enable registration with the home network security domain.

A managed security application extends usage rights and manages one or more bridges to "devices", e.g. content transcription and rights mapping to iPODs, Zunes, and cell phones running third party security technologies. Managed security and bidirectional bridging enables content to be transferred to and from a third party device running a third party security technology. For example, content may be loaded to an iPOD and iPOD content may be purchased by the user from iTunes using the broadband service transferred to the DVR for display in the subscriber's entertainment space.

The User Interface applications may be configured to recognize content type. For example, Copy Control Information may be used to loosely associate usage with content type. High-value content is marked as "Copy Never." Broadcast content is marked as "Copy Freely." A more explicit content type classification that could be used to associate content with device classes, e.g. a particular type of content can be made available to all devices of a particular type, e.g., a particular type of content can only be made available to cell phones.

The usage rules provide the core information governing the rights to use content. This information is combined with user and domain related information stored in the Host or CPE device to create a Content Usage Information (CUI) set for the delivered content. For example, the user's subscription may limit the number of concurrently viewed instances for a particular piece of content.

Content usage information (CUI) is bound to a specific instance of the content and, in the case that a new copy is created as allowed by the current CUI, a new set of CUI is generated. The CUI for a content stream may change dynamically, for example, if the number of concurrent viewings changes as one of the viewings is terminated.

Involvement of the CA system in the provisioning of any new whole-home or MR-DVR service is minimized, including device and service provisioning, and entitlement configuration. A managed provisioning infrastructure facilitates migration to IP Terminal devices 456. However, such an infrastructure does not have to entail a highly complex development, as it could be implemented by leveraging the DOCSIS cable modem provisioning paradigm, which uses standard protocols, such as DHCP, TFTP, and SNMP. The non-CA system controlled device authentication mechanism may also be utilized.

Content sharing may also be implemented by connecting a WiFi dongle to the STB. In this configuration, the UPnP application in the DVR would automatically discover the PC and its content and make it available to the program guide as an on-demand asset. When requested, the PC's DLNA streaming server would stream the asset to the DLNA client in the DVR.

Converged Services Gateway 420 extends video services to devices attached to the broadband home data network. The Converged Services Gateway 420 acts as a bridging and management entity. True IP video delivery is provided over DOCSIS as well as content transfer to any device in the networked home, while enabling new cross-product and cross-service applications. The security domains may thus be extended to the subscriber's data network.

The Converged Services Gateway 420 creates opportunities for revenue generation from innovative business models that leverage network based capabilities to reach into the home. The opportunity to legitimately distribute copyrighted content to multiple devices is maximized, including retail non-managed devices. The seamless sharing of user generated content is enabled and efforts to prevent point-solution providers from introducing, through their CPE, services are enhanced. Switching costs are increased by having tight integration between devices.

The Converged Services Gateway (CSG) 420 acts as a bridge between the media centric home network 410 and the data home network 440, providing options for network bridging, network management, networked storage, WiFi service, and VoIP telephony. The router resource within the converged services gateway 420 provides consistent media streaming between network segments in the home and supports multicasting. In general, the aggregate converged services gateway 420 feature set includes MoCA, Ethernet and 802.11x a/b/g/n for home networking, WEP, WPA/WPA2, 802.1x authentication.

DOCSIS cable modem for Internet access and home routing functions for broadband sharing. SIP based VoIP eMTA with battery backup may also be provided. USB and eSATA interfaces may be used to connect storage and other devices and a DLNA/UPnP media server and control point may be used to stream to media players. An UPnP print server and a security application for providing content protection may be implemented. A firewall may protect the home network from the Internet and the secure video network from user owned devices.

The software environment is complex as it involves provisioning and network management. The converged services gateway 420 is more than a broadband device; it is a hybrid multimedia device responsible for arbitrating multimedia traffic between two vastly different networks. The software stack of the Media Network STBs is configured to be aware of the converged services gateway 420 as a new management entity and negotiate policies accordingly. Devices in the data network that support DTCP can join the managed media network for content transfer under the management of the provisioning and security systems.

Thus, a managed content protection management system is provided that enables interoperability with other content protection and security technologies that also supports managed mobile devices. The whole-home network includes an underlying control plane with an overlaying content security control plane. This combination may interoperate, in terms of content protection and metadata mapping, with other content protection and security technologies, e.g. DTCP, Apple's FairPlay, Microsoft WMDRM, and OMA DRM.

Figure 5:
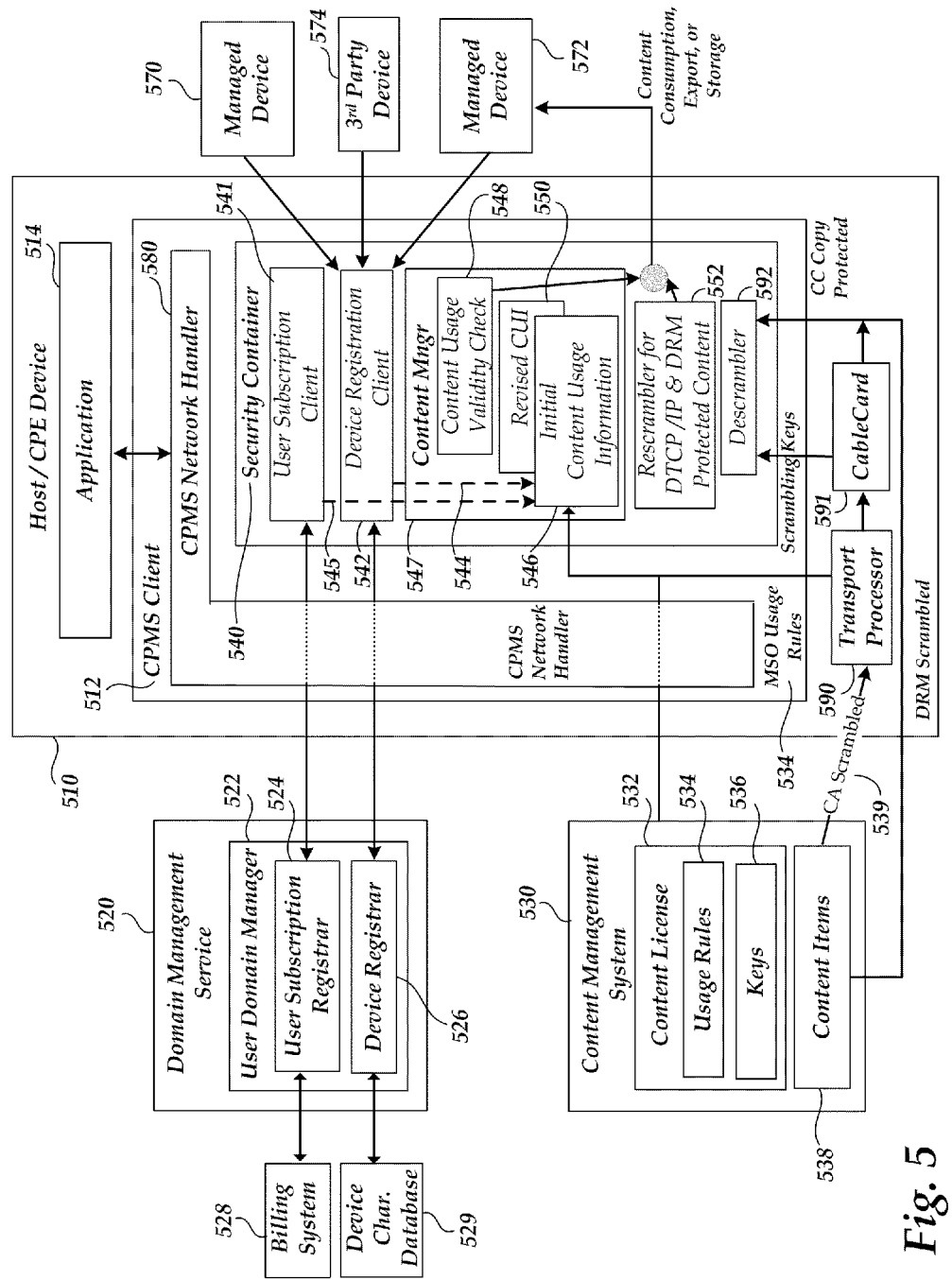
FIG. 5 illustrates an overview of the content protection management system (CPMS) according to an embodiment of the invention.

FIG. 5 illustrates an overview of the content protection management system (CPMS) 500 according to an embodiment of the invention. In FIG. 5, the content protection management system 500 includes the CPMS server 510, the Domain Management System 520 and the Content Management System 530. The CPMS client 512 of the CPE 510 includes a security container 540. The security container 540 provides for the protection of content and other secure data within a constrained environment where cryptographic operations can be safely performed. The security container 540 should be protected against physical and logical attacks that would expose scrambled content or encrypted data, or allow an attacker to modify authenticated messages. The security container 540 also provides storage for critical keys that are used to manage scrambling, descrambling, key exchange and authentication operations. For example, the rescrambler 552 can rescramble the content into an encryption scheme supported by a managed device 570, 572.

The content protection management system 500 expects each managed device to include a security container 540 with clearly defined boundaries and protection mechanisms to prevent disclosure of high-valued content and other critical information. Where devices are also DTCP/IP enabled, the security container 540 is also used to store DTLA keys and manage DTCP/IP link-layer protection.

The security container 540 can be implemented in a device specific manner. For example, in a system that contains a Transport Processor, the security container 540 may be within the secure area of that processor. Alternatively, in a PC, the security container 540 may be supplied on a smart card or similar attachable device. While the CPMS client 512 takes advantage of hardware if present, solutions for software only approaches should be supported. While it is desirable that the security container 540 is deployed in a hardware device, other solutions that do not require additional hardware elements may also be implemented.

The content management system 530 includes a Content License 532 for delivered content that contains the usage rules 534 and other license information relating to content items 538 and which is delivered in conjunction with the content items 538. The content items 538 may be provided as CA scrambled content to transport processor 590 in the CPE device 510. The transport processor 590 provides information to enable the generation of the initial set of Content Usage Information 546. The transport processor 590 also provides the CA scrambled content 539 to the conditional access control device 591 for processing. The conditional access control device 591 provides scrambling keys to the descrambler 592. The conditional access control device 591 may also provide CC copy protected content to the descrambler.

The content items 538 from the content management system 530 may also be CPMS scrambled content, which is provided to the descrambler 592. The Content License 532 includes the keys 536 used to scramble the content. The Content License 532 may be delivered as a part of the content transport stream or independently delivered and associated with the content, e.g., through references in program event information. If passed through the Conditional access control device, the usage rules 534 for a piece of content are not interpreted by the Conditional access control device and are available to the host 510 in the same manner as other information passing through the conditional access control device 591.

The CPMS Client 512 combines the usage rules 534 with user subscription 541 and service entitlement data and with device registration data 544 specific to the CPE 510 to generate an initial set of Content Usage Information 546. The device registration client 544 in the CPE device 510 also enables third party devices 574 to be registered. The user subscription and service entitlement data is retrieved from the User Domain Manager 522 of the domain management service 520. The User Subscription Registrar 524 obtains the user subscription from the billing system 528. The user subscription is authenticated by the User Subscription Registrar 524 and securely delivered and stored in the CPE device 510. This information defines the user current set of service entitlements for the user and any pending changes to those entitlements, e.g., subscription expirations or pending service additions. The device registration data is obtained from the device characteristics database 529. The device registration data is authenticated by the Device Registrar 526 and securely delivered and stored by the device registration client 542 in the CPE device 510. This information defines the devices that are associated with the user's domain (or domains) and the relationships between the user subscriptions and those devices, e.g., a device that is temporarily added to the domain in order to share content for a limit time period.

A single piece of content may need to have usage rules that can be differentiated by the features available to the CPMS Client 510 that interprets these rules. For example, different rules could be applicable to CPMS Clients 510 that use a hardware based security container than those applicable to clients that use a software based security container.

The Content Usage Information 546 is initially generated by applying the usage rules 534 against the restrictions defined in the user subscription(s) obtained from the user subscription client 541 and the devices registered to that user, which is obtained by the CPMS manager 547 from the device registration client 542. As the content is consumed, output or propagated, the Content Usage Information (CUI) is revised 550 to reflect the set of activities applied to that content and the revised CUI 550 is delivered with the content to managed devices 570, 572 in the managed domain, which needs to apply the updated CUI 550 to that content. For example, if there is a limit on the number of copies that can be made of the content, each request for a copy will be recorded at the original acquisition point and the revised CUI 550 passed to the sink device will indicate that only the number of copies requested can be made through that device.

Controls may be included in the CUI 550 to restrict usage of content within the CPMS system. For example, such controls may include: (1) copy and movement control, (2) consumption control, (3) propagation control, (4) output control, (5) scrambling control, (6) storage control, and (7) transcoding control. The initial CUI 546 can be changed before it is passed to a consumption or export point. The following are examples of the changes that can occur:

The Copy Once flag is changed to Copy No More

If the Copy Never flag is set in the original CUI, the Copy Never Internal Retention Limit may be set in the revised CUI. This restricts the storage time of this content in a time shift buffer (or equivalent) and any time shift operations that need to exceed this limit would rely on the ability of the content source to provide that feature.

If the View Period is specified in the original CUI, this is replaced by a Viewing Window which specifies absolute dates.

The standard four CCI states, i.e., Copy Freely, Copy Once, Copy No More, and Copy Never, and the addition of the Copy Never Internal Retention Limit may be stored in the time shift buffer of the consuming system.

Consumption controls may be implemented to define whether and when the content can be viewed. For example, the viewable flag indicates whether the content is viewable. Content may be initially acquired with this flag set to false and the usage rules later updated to indicate that the content is now viewable. The View Window describes the exact time period during which the content is viewable. This assumes that devices are able to synchronize time to a secure source. The CPE device 510 can provide this for attached devices, but remote and mobile devices need to have an independent source. The View Period describes the time period, e.g., in units of 15 minutes, from the time of first consumption of the content during which the content can be viewed. For example, a value of 672 would allow content to be viewed for seven days after first starting to view the content. The View Period is translated to a View Window for any export of the content to another managed device. The Simultaneous View Count limits the number of consumption points that can simultaneously view the content. This control is only effective during the content broadcast period and a new set of CUI is issued to any device that has stored the content at the end of that period.

Propagation Controls may be used to define the localities and domains to which the content can be moved or in which the content can be viewed. There are separate controls managing movement and viewing. For example, a control for content may be set to move or view the content in local proximity, irrespective of domain constraints, to move or view in local managed domain, to move or view in geographically restricted managed domains, to move or view in entire Managed domain, to move or view anywhere, etc. These controls require some means to securely define the locality of each device. This could be provided through Host Parameters managed from the cable headend for attached devices, but may also use a GPS or similar technology for remote and mobile devices.

Additionally, controls are provided that allow for the transition of move and view rules restricting content to a local or geographic domain to those restricting content to the entire trusted domain. These controls allow the content to be viewed in the entire trusted domain after a specific date and for this to be applied as either all content to be viewed immediately after that date or for there to be a moving window that restricts the portion of content that can be viewed after that date. For example, content that was delivered 20 minutes after the program started could be viewed 20 minutes after the specified date in the moving window scenario, or would be viewable immediately after the specified date if the moving window control is not activated.

Selectable output controls are also capable of being provided. For example, consumption may be allowed via analogue SD or via analogue HD. Control over the export and consumption to digital devices may also be provided. For examples, controls may be provided to allow export via IEEE 1394, DVI, HDMI, Ethernet, USB Connector, SATA, etc.

Controls for content that is to be exported outside of the managed domain may be configured to allow export to specific CPMS that has a defined mapping for the usage rules applied to managed content, to export to any DTCP/IP registered device, to export to any device, irrespective of the CPMS or Copy Protection System used by that device (if any), to limit the resolution of analogue HD export and consumption to 520,000 pixels per frame, and to limit the consumption, storage or export of content to devices with specific characteristics. For example, the controls may only allow export to devices with a hardware based security container used by the sink device CPMS Client 512.

The Content Usage Information includes a flag to indicate that the content does not need to be scrambled for consumption or export to other devices. The Content Usage Information also provides controls over the devices that can be used to store content within the managed domain. For example, such controls may be configured to allow storage to DVD-R media, DVD-RAM media, DVD-RW media, DVD-VR format, HD-DVD, Blu-ray Disc, a local hard drive, an external hard drive, etc.

The Content Usage Information can also include a list of formats to which the content is allowed to be transcoded. The list could be supplied as either a set of allowable formats for transcoding or a set of disallowed formats. Separate lists can be supplied for each type of content; audio, video, still picture, etc.

When content is exported with DTCP/IP link-layer encryption only, no CUI information is supplied to the sink device. In this case the only controls that are available are through the EMI in the DTCP/IP packet protocol and the matching CCI bits in the content stream. The DTCP/IP enabled sink is required to manage the content according to these EMI and CCI bits as described in the DTCP/IP specifications.

As indicated above, the CPMS system involves the registration of users (or subscribers) and of managed devices in a manner that securely creates associations between these entities to form domains within which items of content can be managed according to the usage rules for that content.

In order to perform these management operations, each device needs to contain a private key and that key needs to be securely associated to the device. Similarly, each user needs to be issued with a private key and the key bound to the user. This public key infrastructure provides a framework that allows for the secure exchange of identity and other information between devices. The Certificate Authority provides the operational entity for the generation, authentication and distribution of "certificates" to users and to device manufacturers for insertion into the device's security container. The term "certificate" does not imply any particular structure beyond the association of a key to an entity and the authentication by the Certificate Authority of that association.

The implementation of the public key infrastructure may utilize a chain of keys originating from a self-authenticated root key with each key in the chain managed by a separate entity. The design of the public key infrastructure needs to take into account the security of each key in the chain and balance this against the cost of performing cryptographic operations in downstream devices.

The Certificate Authority will also be responsible for the management of key revocation, key renewal and for providing key status information necessary to advise other parties of these management changes. The Certificate Authority will ensure the security of the keys that it holds, preferably by storing these keys within the confines of a FIPS 140-2 Level 3 Hardware Security Module. Additionally, the Certificate Authority will operate according to a set of policies and practices laid out in the form specified in IETF RFC 3647.

The Certificate Authority needs to be permanently available to networked CPE devices that are using the content protection. The CPE acts as a proxy in provisioning information from the Certificate Authority to other devices.

The Certificate Authority needs to generate keys and provide these to device manufacturers who will securely embed these keys into their devices and associate each key to a unique device identifier. There are a number of models that can be used to provide keys and capture the key to device associations; the set of models to be supported needs to be agreed with the CE community.

A single Content Protection Policy Engine is preferred for administering policies for all its devices across all its markets. The main role of the Policy Engine is the translation of business policy into content protection and rights management directives and the communication of such directives to all the CPMS servers and all other servers associated with the content protection function. One of the policies that are required to be communicated is the determination of what types of content can be played, transferred or stored per device class. The device classification may start as a crude classification, such as whether a device is HD capable or contains a security processor, but may evolve with time to support more elaborate taxonomies to support new business models and content protection requirements imposed by content owners and industry organizations.

The CPMS Network Handler 580 is envisioned to be an OCAP privileged application or native application that is provided by the CPMS vendor and provides several basic functionalities. The CPMS Network Handler 580 provides an application interface and a network interface. In order to implement new business models beyond Pay-Per-View (PPV) and encrypted Video-On-Demand (VOD), applications must be able to communicate with the CPMS manager in a managed device. In order to allow applications to operate with a variety of DRM, a set of standard interfaces needs to be defined for applications to communicate with the CPMS manager.

The CPMS Network Handler 580 provides an interface to applications 514 of the CPE device 510. In order for the CPE devices 510 to communicate with the CPMS, a new messaging protocol and set of data structures are defined. Some of the network information communicated over the CPMS Network Handler 580 can relate network topology and communication protocols supported. Additionally, usage rules policy directives including content rights mapping tables and transcription information can be communicated using the CPMS Network Handler 580 interface.

DTCP, which may be used for the secure distribution of content based on CCI, may be leveraged as part of the CPMS overall architecture. While the DTLA licenses provide for the use of the DTCP/IP transport protocol, the license agreement includes higher layer requirements and robustness rules for the client or device that is making use of DTCP/IP. For example, The DTLA license places requirements on approved encryption methods for the storage of content, rules for moving "copy no more" content, and provides a set allowable retention values that can be associated with content.

For those business models not natively supported by DTCP/IP, the CPMS client 512 will provide a higher layer control plane for communicating usage rules associated with content transmitted via DTCP/IP. This approach enables the service provider to standardize on DTCP/IP as the single transport layer scrambling and content usage information interface for content. The CPMS clients 512 communicate to authenticate applications, exchange usage rules, and are responsible for their enforcement. It is important to note that extending the business rules beyond DTCP/IP native capabilities should not violate DTLA licensing. The DTLA is primarily concerned with enforcing business models approved by the content providers. As long as the enhanced business rules do not violate any agreements with content owners, the device implementation remains within the guidelines of the DTLA licensing agreement.

Rather than implement a complex mediation service to allow content to flow between content protections domains, DTCP/IP is leveraged as a common interface between domains. This will require DRM vendors to be licensed as an approved output of DTCP/IP. Windows Media DRM, for example, is currently certified as an approved output from DTCP/IP.

A Host device in the managed domain supports an OCAP stack and provides the ability to run OCAP applications. Other CPE devices in the managed domain may also be OCAP enabled, but it should not be assumed that all devices will be capable of running OCAP. It may be possible for part or the entire CPMS Client running within a managed device to be installed as an OCAP application. Vendors should consider whether this would be advantageous for their system and indicate any necessary extensions to OCAP to support their proposed solution.

While OCAP provides a standard set of middleware APIs for application development, it is not likely that non-cable centric devices will run OCAP. Remote User Interface (RUI) technologies are one approach that may minimize the client development requirements. Of particular interest are browser based approaches. CEA 2014, specifically, has been gaining industry acceptance and is specifically being included in DLNA device profile specifications. Vendors should consider the impacts to supporting a CPMS client running in a CEA 2014 environment.

There are a number of standards initiatives that are currently addressing aspects of content protection and digital rights management within the home network. These include CableLabs development of Home Networking and Home Networking Security specification, CableLabs development of a Digital Rights Interface and the Bi-directional OpenCable Receiver specification, ATIS enhancements to the Conditional access control device interface specifications to carry enhanced CI and other content protection information, and DNLA Content Protection Subcommittee (CPS). However, those skilled in the art will recognize that the present invention is not meant to be limited to any such standards.

The development of the CPMS recognizes and, where necessary, co-operates with these standards initiatives to develop a cohesive solution. It is expected that parts of the CPMS will lead to enhancements to current standards or the development of new standards under the auspices of one of the current cable industry standards development bodies.

Figure 6:
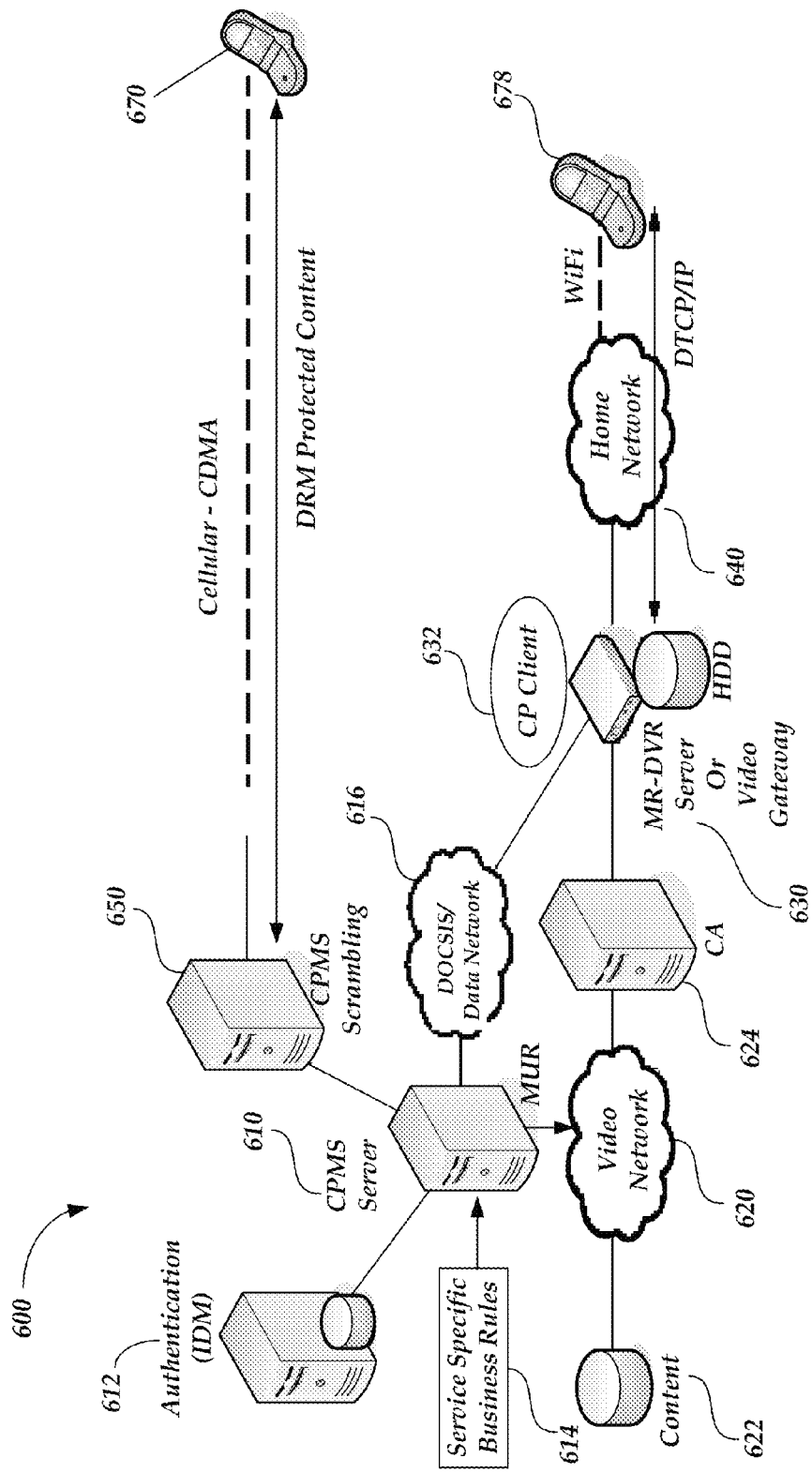
FIG. 6 is a diagram showing the components of a CPMS network having conditional access and trusted domains according to an embodiment of the invention.

FIG. 6 is a diagram showing the components of a CPMS network 600 having conditional access and trusted domains according to an embodiment of the invention. In FIG. 6, an CPMS server 610 is coupled to an authentication server 612. In addition, service specific business rules 614 are provided to the CPMS server 610. The CPMS server 610 provides Internet and other data service to MR-DVR server or video gateway 630. The CPMS server 610 provides user rules to the video network 620, which may be applied to content 622. A conditional access server 624 receives the content with the user rules, which is then provided to MR-DVR server/video gateway 630. The MR-DVR server/video gateway 630 includes a CP client 632.

The MR-DVR server/video gateway 630 provides content to the home network 640, which is then routed to device 678 in the trusted domain. CPMS Scrambler 650 provides encryption for providing CPMS protected content to device 670 over a cellular network.

Mobile or other hybrid devices 670 that have connectivity to a cellular or other IP networks not based in the home will need to support a content protection mechanism other than DTCP for the consumption of content over these networks. DTCP as currently designed is limited to in home networks and has both hop count and latency restrictions that prevent from being used as a WAN technology. Therefore, a more traditional DRM protection of content transmitted over WAN networks needs to be supported within the CPMS network 600. While these devices are connected to the home network 640 and consuming content through the home gateway 630, DTCP/IP will be used as the content protection technology.

The CPMS server 610 uses DTCP/IP for content protection at the link layer between licensed DTLA devices 670, 678 for usage rules supported under the DTLA license agreement. Such devices are expected to provide a fully compliant DTCP/IP interface for the transfer of content between devices in that domain. For content that requires additional usage rules, DTCP is augmented with a CPMS control plane for the expression of Usage Rights and Content Usage Information.

CPMS server 610 implements a single CPMS Policy Engine may be used to administer policies for all its devices across all its markets. The main role of the Policy Engine is the translation of business policy into Content protection and Rights Management directives and the communication of such directives to all the CPMS servers and all other servers associated with the content protection function. One of the policies that may be required to be communicated is the determination of what types of content can be played, transferred or stored per device class. The device classification may start as a crude classification, such as whether a device is HD capable or contains a security processor, but may evolve with time to support more elaborate taxonomies to support new business models and content protection requirements imposed by content owners and industry organizations.

The descrambling and scrambling of content and content metadata may take place within the confines of a security container (see 540, FIG. 5) that is resilient against logical and physical attempts to expose secret data. The security container could be included in the transport processor or within a special hardware component or resilient software module. Each device within the managed domain may need a suitable security container.

The processing entity may be responsible for the transformation of content between two different formats. For example, the transformation may improve the conversion of audio content in WAV format to AAC format. Transformation may be necessary where content is being exported to devices that only support a restricted range of formats and may require that the content is descrambled from its current format, transformed to the output format and then re-scrambled. This type of transformation needs to take place within the security container.

Devices within the managed domain may include content storage capability that is accessible in a unified manner through a DVR storage management service. The CPMS server 610 allows stored content to be played while a device is disconnected from the Host system and for stored content to be played on other devices in the Managed domain while the storage device is connected to the Host system. In both of these cases the consumption of the content is contingent on the appropriate rights being specified in the Content Usage Information.

Selectable output controls may provide the content provider with a means to limit the consumption, storage and export of specific items of content to particular outputs, output formats or recording formats. The selectable output controls are securely carried in the content metadata and remains associated with the content throughout its life-cycle.

User services may be managed through a billing systems which provide information relating to the user, the managed devices owned by the user, and the managed services to which the user subscribes. This information is needed within the CPMS server 610 to establish the rights that the user has to content distributed over the network.

The CPMS server 610 provides a flexible mechanism through which a Host or other managed device interface to managed services and locally manages content. The CPMS server 610 ensures that content is managed according to the CPMS Policies delivered from the CPMS networked services.

The CPMS server 610 expects that each item of content delivered to the Host or CPE device 632 will be accompanied by a set of metadata that describes the structure, format and rights associated with the content. The CPMS license will be included in this metadata and will be secured by authentication from the managed network. The metadata may also include information that allows the Host or CPE device 632 to retrieve the content scrambling key in the case where the content is not delivered through the Conditional access control device.

The usage rules provide the core information governing the rights to use content. This information is combined with user and domain related information stored in the Host or CPE device 632 to create a Content Usage Information (CUI) set for the delivered content. For example, the user's subscription may limit the number of concurrently viewed instances for a particular piece of content.

The CUI is bound to a specific instance of the content and, in the case that a new copy is created as allowed by the current CUI, a new set of CUI is generated. The CUI for a content stream may change dynamically, for example, if the number of concurrent viewings changes as one of the viewings is terminated.

To ensure the integrity and authenticity of data exchanged between the CPMS client 632 and other managed devices and the CPMS server 610, digital signatures and data encryption may be applied to the message flows between the head-end systems and the managed devices The use cases described below use the base concepts of a content acquisition point, consumption point, export point, storage entity and processing entity. Some of the use cases refer to selectable output controls, usage rules or CPMS Licenses. It is assumed that these artifacts will be delivered with the content stream and assessed in the Host or networked CPE device 632 to determine the allowable set of actions for that content stream according to the CPMS compliance and robustness rules. The method of delivery of MUR to the Host should not rely on any current or enhanced CableCARD™ functionality.

The Viewing Control Window determines the start time and duration of a time interval when the content is available for viewing by the consumer. In a first example use case, a customer subscribes to HBO on-demand, and can transfer/copy the selected monthly HBO content onto their portable media player. At the end of the month, all the content on the portable media player must expire and become not available for viewing.

Viewing count control determines how many times the content can be viewed by the consumer. Example use case: A customer rents a theatrical window movie through VOD/download, and transfers the movie to a portable media player. The customer is allowed to view the movie 2 times within the associated viewing window.

Copy and Move Control determines how many copies of the same content can be made, whether the content can be moved from device to device, and whether the content has to be locked or paired to a specific device. In one example use case, a customer records an HBO movie on their DVR and then copies or moves the movie to their portable movie player. In a second use case, rights are licensed to a particular piece of content that is allowed to be distributed to any device that meets compliance and robustness requirements, registered within a customer's domain (STB, PC, PMD, burn to DVD, etc.)

Ownership Transfer determines whether a piece of content can be transferred as a permanent copy onto a separable recording medium by the subscriber. A service on a portable media player may allow the customer to burn a DVD copy of the movie (own the movie) for an additional charge.

Redistribution Control determines whether the content can be redistributed from the device receiving the content (the sink) to other devices based on restrictions conveyed by the usage rules. Restrictions may take the form of proximity restrictions, geographic restrictions, or other types of restrictions. In one example use case, rights are obtained to offer a theatrical window movie rental program, but must not allow the customer to redistribute the content over the Internet. In a second example use case, rights are licensed to a particular piece of content are only authorized within the U.S. If a portable media player containing the content is taken by a customer to Europe on vacation, the content must not be accessible while the PMP is outside the U.S.

Content Format Control determines what format the content must be displayed in or sent out to a downstream device (HD/SD/image constrained/etc.). In a first example use case, rights are obtained to offer a theatrical window movie rental program, but if the display device supports analog outputs the source device must down-res the format of the movie before it is sent to the display (sink) device.

Content discovery within the home network is assumed to use UPnP/DNLA (with potential CableLabs enhancements) based protocols. For devices not connected to the home network or content that is not sourced (directly or indirectly as in a home GW model) within the home network, application layer content discovery is assumed. In both cases, some or all of content meta-data may be protected such that only a CPMS client can access it. The use cases in the following sections apply not only to the content itself, but to the meta-data as well.

The goal for content shared within the home network is to leverage DTCP and DTLA licensing for content protection and application layer authentication to determine which devices can receive the content, inclusive of the meta-data. The goal for content shared outside the home network is to leverage DVB CPCM for protection of content and associated metadata containing content usage information. In both of these cases, delivery of the metadata should be included within the content stream itself, for example by reserving a transport stream PID specifically for carriage of content usage information.

Figure 7:
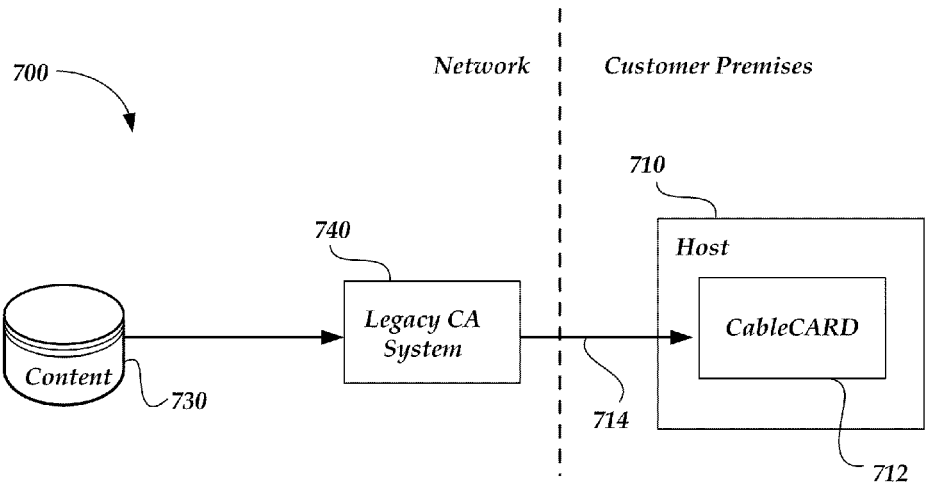
FIG. 7 illustrates acquisition of managed content under the control of a conditional access system according to an embodiment of the invention.

FIG. 7 illustrates acquisition of managed content under the control of a conditional access system 700 according to an embodiment of the invention. The enforcement point for CA in the Host 710 is the CableCARD™ 712. The acquisition of managed content 730 under the control of a conditional access system 700 is accessed through the CableCARD™ 712. Managed Content 730, containing the CCI byte that describes the limitations on the use of that content, is provided via the legacy CA system 740 to the CableCARD™ 712 via the cable connection 714. Content may be scrambled using the proprietary CA System in force at the headend.

If necessary, content is descrambled by the CableCARD™ 712. Copy protected content is forwarded to the receiver in a scrambled format proprietary to the Conditional access control device operator. The CCI information is forwarded to the Host according to the CCIF messaging protocol. Content may be descrambled by the transport processor in the Host for rendering to the viewer or captured to a local storage device for later consumption.

Figure 8:
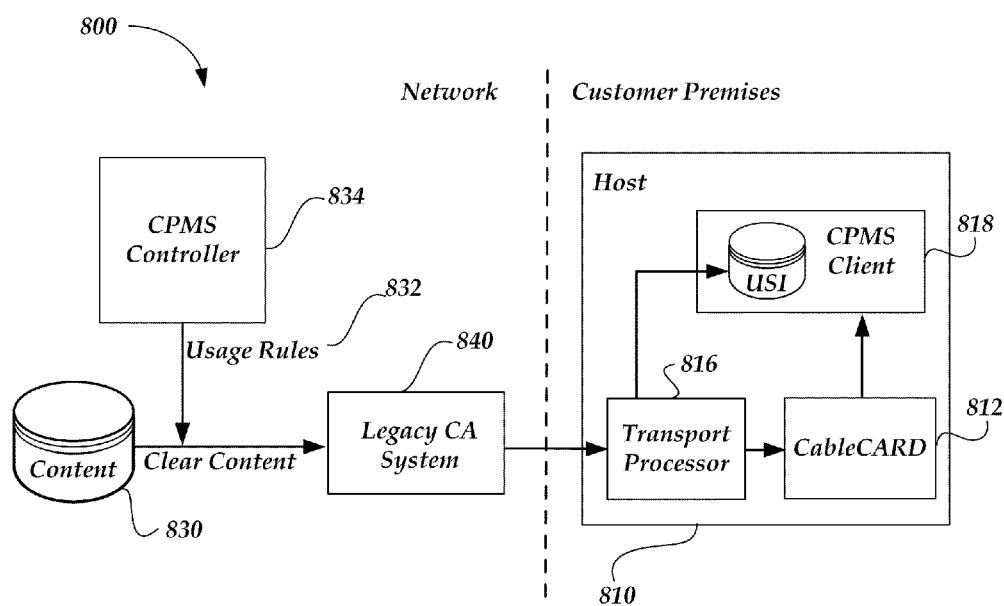
FIG. 8 illustrates acquisition of managed content under the control of a conditional access system with usage rules according to an embodiment of the invention.

FIG. 8 illustrates acquisition of managed content under the control of a conditional access system with usage rules 800 according to an embodiment of the invention. In FIG. 8, managed content 830 is delivered to the legacy CA system 840. Usage rules 832 are provided by CPMS controller 834. The usage rules 832 provide control beyond the CCI byte included with the content stream.

The managed content 830 and usage rules 832 are provided to Host 810 via the CableCARD™ 812. Content may be scrambled using the proprietary CA System in force at the headend. If necessary, content is descrambled by a Conditional access control device. The CCI information is forwarded to the Host 810 according to the CCIF messaging protocol. The Host 810 includes a CPMS client 818 for extracting the usage rules 832 from the content. Content Usage Information is provided to the USI database 819. If allowable by the usage rules 832, the content may be descrambled by the transport processor 816 in the Host 810 for rendering to the viewer or captured to a local storage device (not shown) for later consumption.

Figure 9:
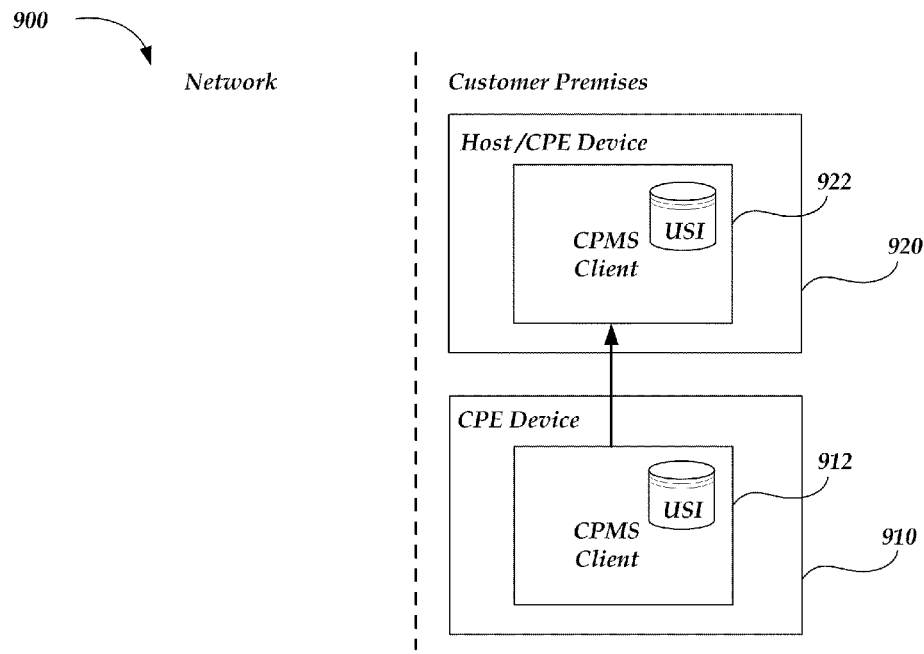
FIG. 9 illustrates acquisition of CPMS content from within a managed domain according to an embodiment of the invention.

FIG. 9 illustrates acquisition of CPMS content from within a managed domain 900 according to an embodiment of the invention. The acquisition of CPMS content illustrated in FIG. 9 applies to content outside the control of a conditional access system. In FIG. 9, the content is acquired within the managed security domain, either within the home network or directly from the headend with only CPMS protection and usage rules and without CA content protection. More specifically, in FIG. 9, the content has been acquired by devices that are registered as part of the managed domain. All transfers in this use case are between devices within the managed domain.

A user registers a device into a home network domain. This process involves, at least, the addition of a device identity to the domain and may involve the evaluation of security information installed in the device or the supply of new security information to the device. A user acquires content with usage rights controlled within the managed domain. For example, the user may have set up a subscription service that allows download of previously broadcast content or may have entered into a VoD transaction for IP download to its portable video player.

The scrambled content is supplied with a managed CPMS license that expresses the usage rights for that content and limits the transfer of that content to other devices in the managed home network domain. The content is descrambled by the device in the home network where it is being rendered. The descrambling information is contained in the CPMS license and is understood by devices registered to the users managed home network domain.

Thus, in FIG. 9, content from CPE device 910 may be transferred to Host/CPE device 920. The CPMS client 912 in CPE device 910 works with the CPMS client 922 in CPE device 920 to complete the transfer of the content.

Figure 10:
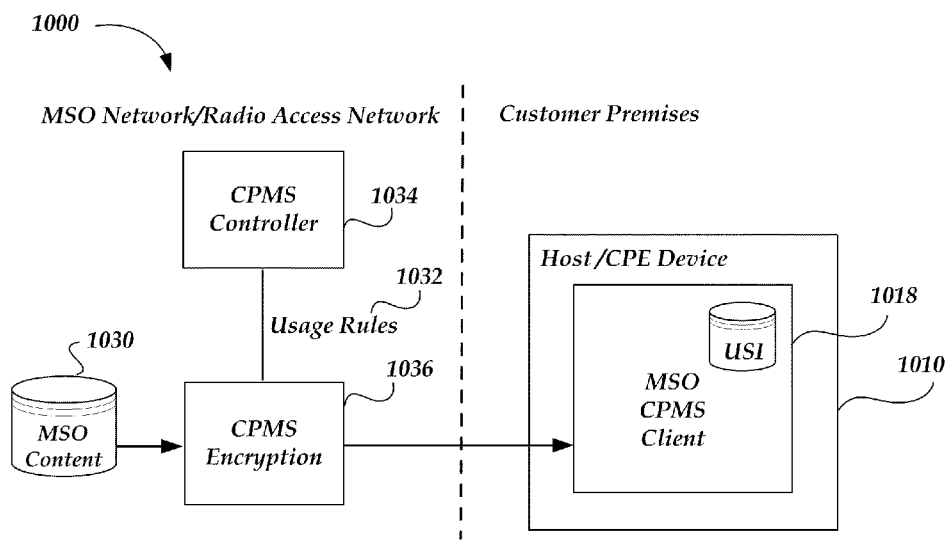
FIG. 10 illustrates the acquisition of content from the network according to an embodiment of the invention.

FIG. 10 illustrates the acquisition of content from the network 1000 according to an embodiment of the invention. In FIG. 10, the content 1030 is delivered to the host/CPE device 1010 with only CPMS protection. The CPMS controller 1034 provides usage rules 1032 that are delivered with the content 1030. The usage rules 1032 describe both the copy controls to be applied to the content 1030 and the additional rules for content management as required by the CPMS. The client device 1010 may be connected to the home network or may be outside of the home and connected via a cellular radio access network (RAN).

The CPMS encryption 1036 and the Host/CPE device 1010 perform the necessary key exchange protocols to enable content descrambling and usage rule authentication. Content 1030 may be scrambled using the CPMS encryption 1036 in force at the headend. Additional usage rules, which may be supplied through other transport mechanisms, may also be used to govern the consumption, storage, processing and export of this content. CPMS protected content is forwarded to the Host/CPE device 1010 in a scrambled format.

The Host/CPE device 1010 includes a CPMS client 1018 and extracts the usage rules 1032 and the CCI from the content and generates Content Usage Information appropriate to this content. If allowable by the usage rules 1032, the content may be descrambled by the Host/CPE device 1010 for rendering to the viewer or captured to a local storage device for later consumption.

Figure 11:
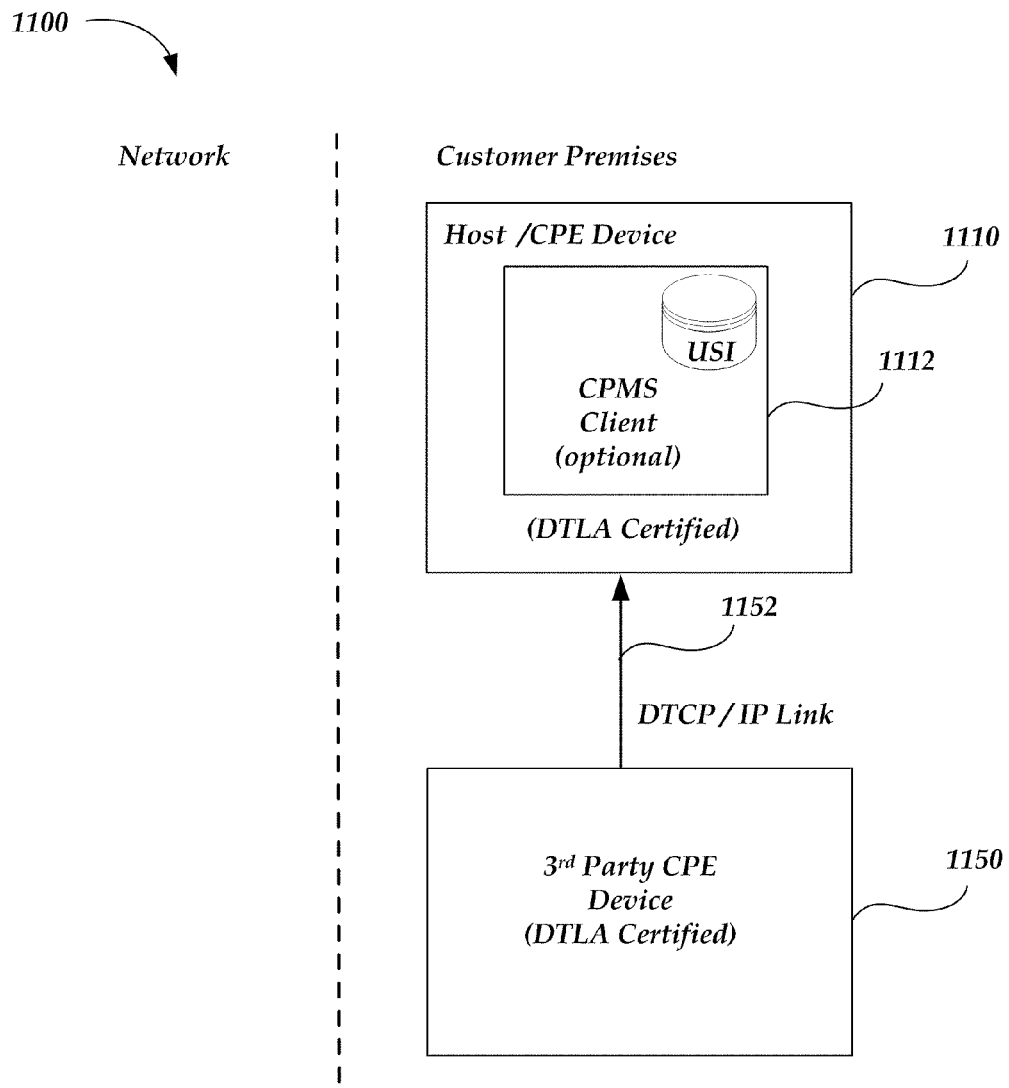
FIG. 11 illustrates the acquisition of content via a DTCP-IP enabled connection according to an embodiment of the invention.

FIG. 11 illustrates the acquisition of content via a DTCP-IP enabled connection 1100 according to an embodiment of the invention. In FIG. 11, content has been acquired on a DTCP/IP enabled device 1150 that is connected to other DTCP/IP enabled devices within the in-home domain. There are no usage rules supplied with the third party content, only usage rules supported by DTCP/IP.

The acquiring device, i.e., the Host/CPE device 1110, and the third party device 1150 exchange DTCP certificates and System Renewability Message data via the DTCP-IP link 1152 to verify their revocation status within the DTLA infrastructure. The third party device 1150 determines that the content can be delivered to a DTCP/IP enabled device based on its CPMS license or other proprietary information. The third party device 1150 scrambles the content according DTCP delivery rules and forwards the content and the content keys to the Host/CPE device 1110.

The Host/CPE device 1110 examines the EMI information in the IP packets delivered to it and descrambles the content using the provided content key. If the content contains CCI bits, the Host/CPE device 1110 correlates the EMI information with the CCI bits and acts according to DTCP/IP rules for content. The Host/CPE device 1110 honors the EMI information provided with the content and honors any default rules applied to content acquired over DTCP/IP into the domain of the Host/CPE device 1110. Since there are limited usage rules that can be supplied with the content, there may be a set of default rules that apply beyond the EMI/CCI bits and DTCP-_Descriptor (if the content is encapsulated in a MPEG Transport Stream) supplied with the content. For example, the OpenCable BOCR-HMS content protection requirements.

Figure 12:
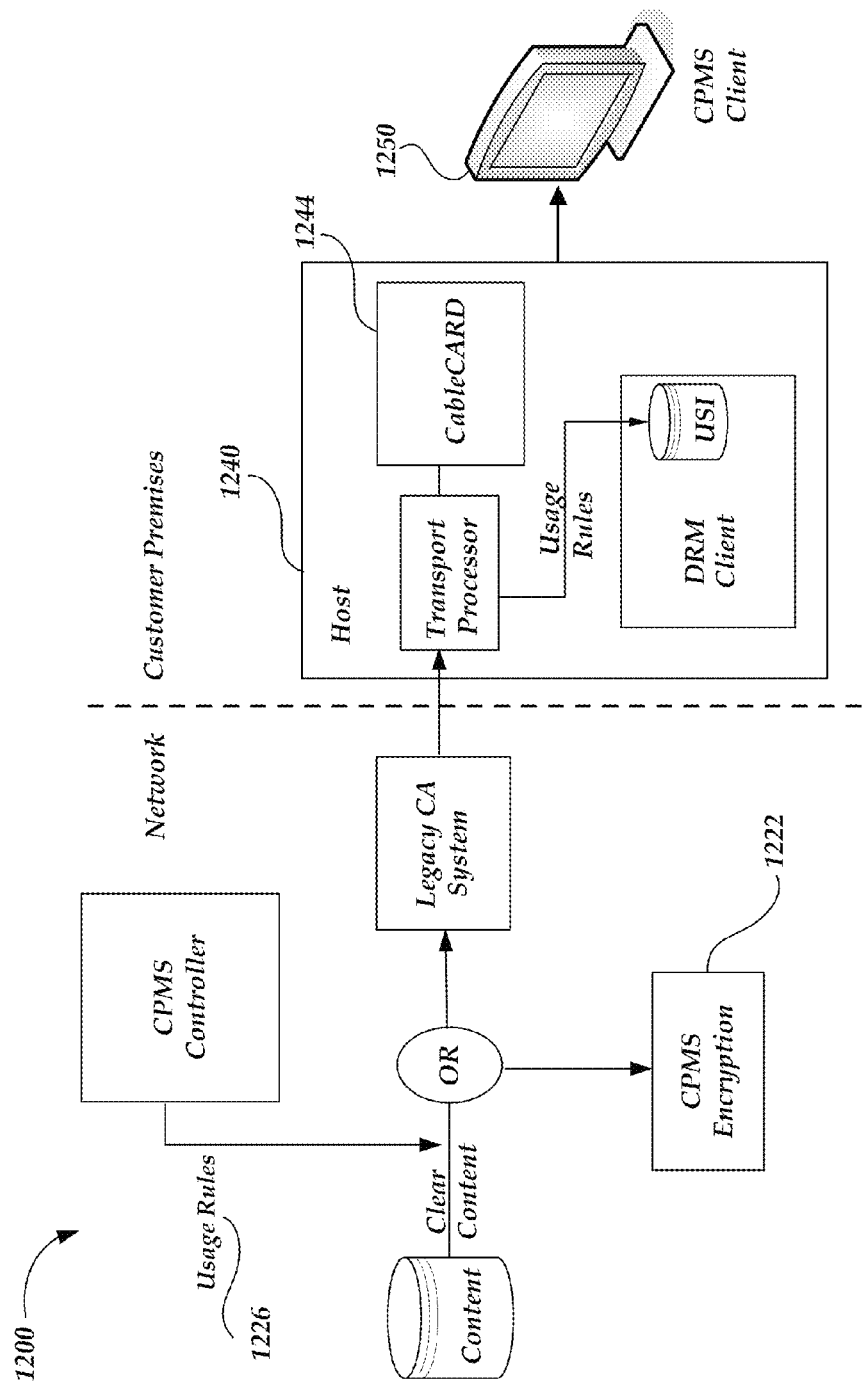
FIG. 12 illustrates the consumption by a local enabled Host/CPE device of conditional access or CPMS acquired content according to an embodiment of the invention.

FIG. 12 illustrates the consumption by a local Host/CPE device of conditional access or CPMS acquired content 1200 according to an embodiment of the invention. Herein, the term consumption relates to content that is being played out to a rendering device but is not being stored or copied on that device. In some of the use cases, content is under the control of the CA system, but may also include CUI as defined by a CPMS system. In other use cases content is only under the control of a CPMS system.

In FIG. 12, content is delivered over the cable network at the point of acquisition of that content. The flow illustrated in FIG. 12 is an extension to current conditional access control device behavior in that it supplements the core CCI bits with additional usage rules carried with the content. Content is passed through the Conditional access control device 1244 and any CA scrambled content is descrambled by the Conditional access control device 1244. High value content, as defined by the CCI bits, is then rescrambled under control of a conditional access control device and forwarded to the Host device 1240. Other content is forwarded to the Host device 1240 in the clear.

The headend forwards any additional usage rules 1226 to the Host device 1240 over an agreed input source. The additional rules need to be authenticated by the Host device 1240 before enforcement. The Host 1240 reviews the usage rules and validates that the content is available for rendering to the consumption point. For example, the selectable output control rules may prohibit rendering or restrict the resolution of the output, or there may be a limit on the number of consumption points to which this content can be concurrently rendered.

The Host 1240 descrambles the content and applies any format changes necessary prior to rendering the content at the consumption point. The Host 1240 updates the Content Usage Information to indicate that the content is being consumed by the Host 1240. At the end of content play, the Host 1240 may update the Content Usage Information to indicate that the content is no longer being consumed by the Host 1240.

FIG. 12 further illustrates the consumption by a Host/CPE device of CPMS delivered content. In FIG. 12, the CPMS encryption 1222 in the headend performs a key exchange with the CPMS client 1250 of the Host/CPE device 1240 to provide content protection keys.

The headend delivers CPMS protected content to the Host/CPE device 1240 independently from the CableCARD™ 1244. The headend forwards any additional usage rules 1226 to the Host/CPE device 1240 over an agreed input source. The additional rules need to be authenticated by the Host/CPE device 1240 before enforcement.

The Host/CPE device 1240 reviews the usage rules and validates that the content is available for rendering to the consumption point. For example, the Selectable Output Control rules may prohibit rendering or restrict the resolution of the output, or there may be a limit on the number of consumption points to which this content can be concurrently rendered. The Host/CPE device 1240 descrambles the content and applies any format changes necessary prior to rendering the content at the consumption point.

The Host/CPE device 1240 updates the Content Usage Information to indicate that the content is being consumed by the Host/CPE device 1240. At the end of content play, the Host/CPE device 1240 may update the Content Usage Information to indicate that the content is no longer being consumed by the Host/CPE device 1240.

Figure 13:
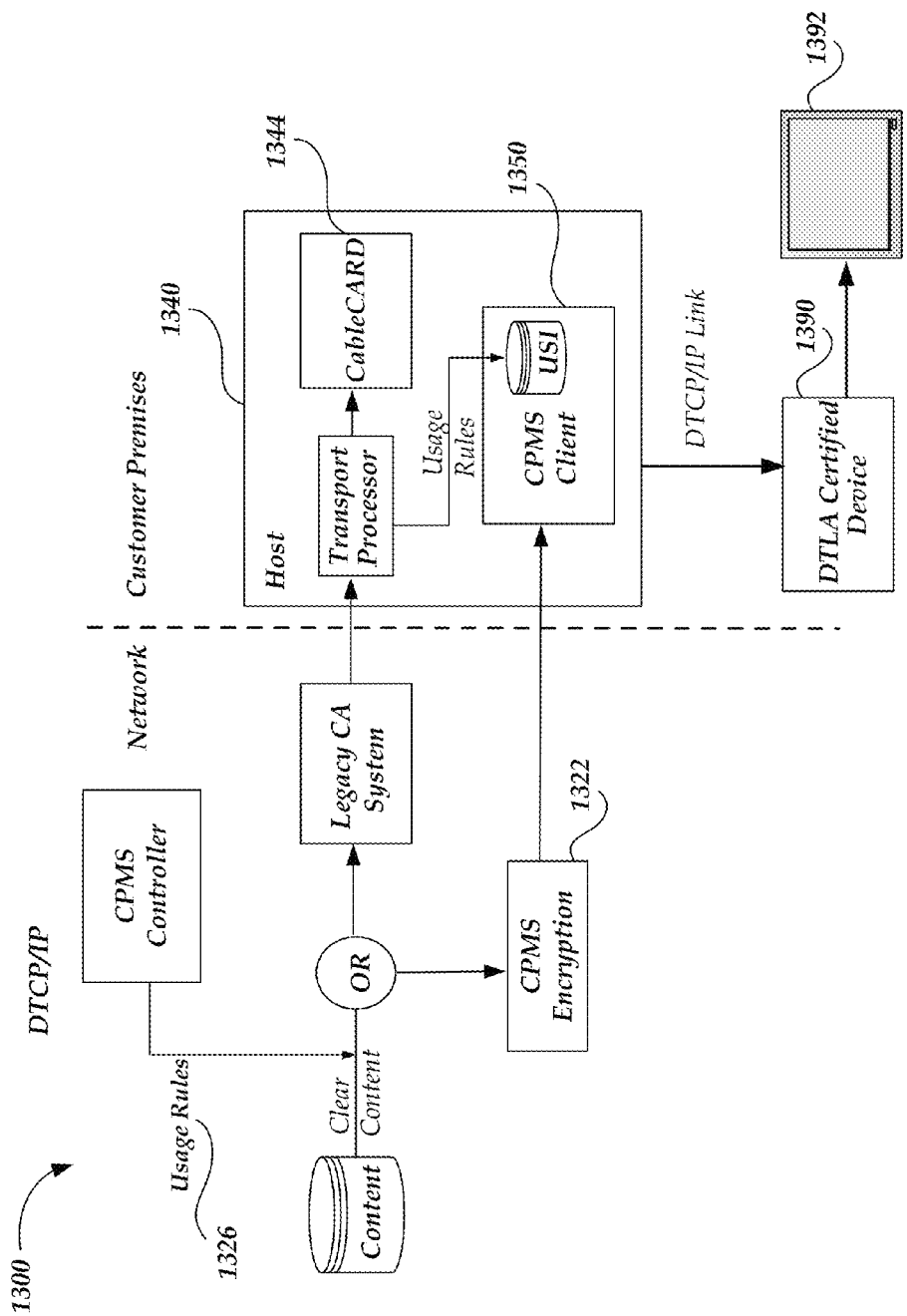
FIG. 13 illustrates the consumption by a DTCP-IP enabled device according to an embodiment of the invention.

FIG. 13 illustrates the consumption by a DTCP-IP enabled device 1300 according to an embodiment of the invention. In FIG. 13, content is delivered over a cable network by a device that is DTCP-IP enabled and able to receive content from a conditional access control device. The Host device 1340 acts as a DTCP-IP source to provide the content to the DTCP/IP enabled sink device 1390. The Host device 1340 verifies the sink device 1390 and performs a DTCP-IP key exchange with the sink device 1390.

The Host device 1340 verifies that the Selectable Output Control within the usage rules allow rendering of content to the sink device 1390. This may involve the sink device 1390 declaring its capabilities to the Host device 1340. Alternatively, the DTLA may embed some details of capabilities in the Device Identifier. This also requires the carriage of Selectable Output Control information with the content.

The Host device 1340 descrambles the content that it has acquired from the Conditional access control device 1344 or as CPMS scrambled content directly from the CPMS encryption system 1322, and rescrambles the content for DTCP-IP transmission using the key exchanged with the sink device 1390. The Host device 1340 may modify the CCI bits from Copy Once to Copy No More if this is required by the usage rules 1322 and the device characteristics of the sink device 1390. The Host device 1340 includes EMI bits in packets delivered to the sink device as required by DTCP-IP.

The Host device 1340 updates its Content Usage Information to indicate that the content is being consumed by the DTCP-IP sink device 1390. At the end of content play, the Host device 1340 may update the Content Usage Information to indicate that the content is no longer being consumed by the Host device 1340. The sink device 1390 descrambles the content and renders the content to the viewer 1392.

Figure 14:
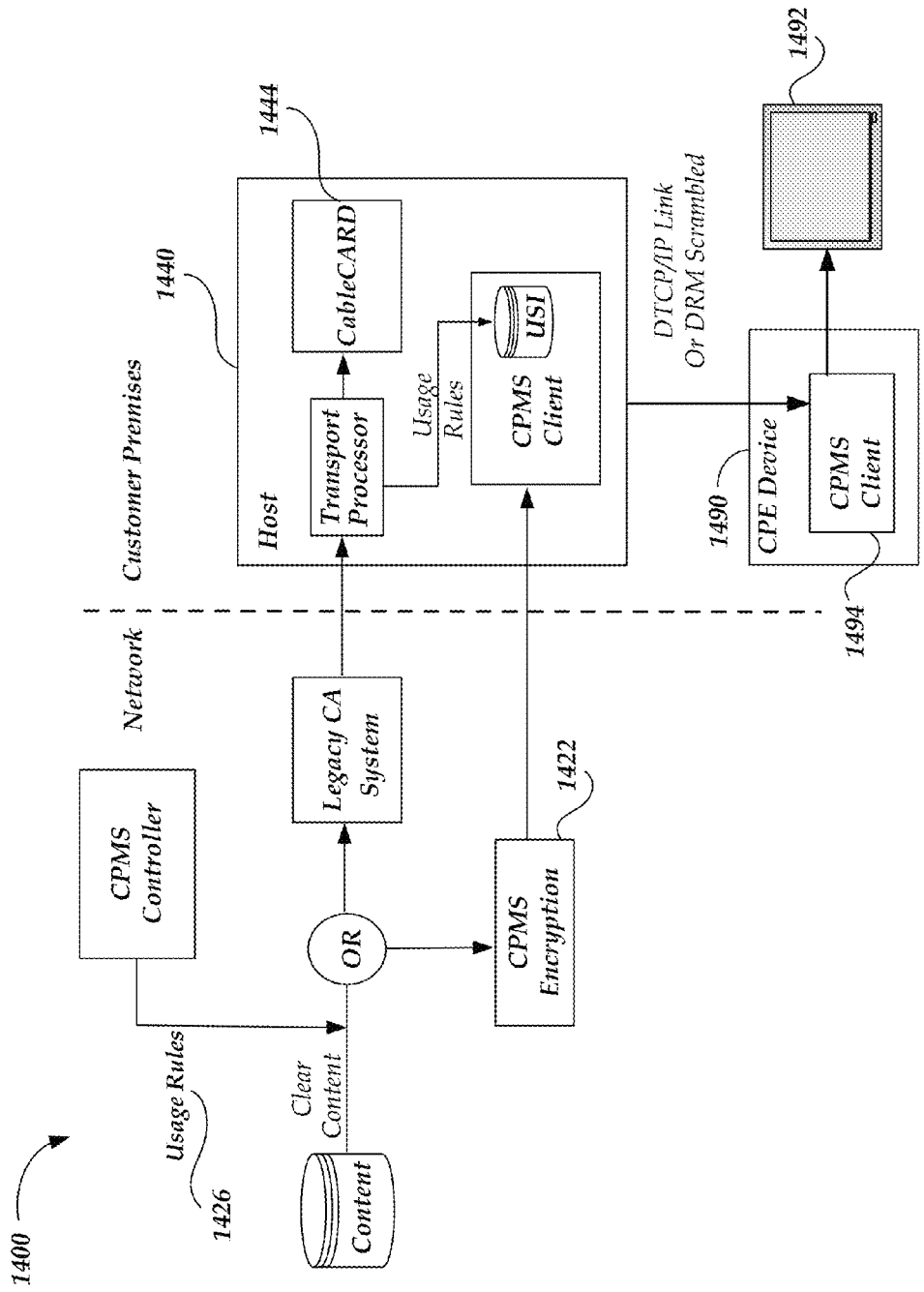
FIG. 14 illustrates the consumption of content by a managed device according to an embodiment of the invention.

FIG. 14 illustrates the consumption of content by a managed device 1400 according to an embodiment of the invention. In FIG. 14, content is delivered over the cable network to a CPE device 1490 that is registered within the user's managed domain. DTCP/IP link layer provide protection for consumption of the content. If the sink device 1490 is also a DTCP-IP enabled device, the source device 1440 can choose whether it supplies the content under the control of the CPMS or under the control of DTCP/IP. Consumption controlled by the CPMS has the advantage of being able to fully transfer the usage rules which may not be fully expressible under DTCP-IP control.

The Host device 1440 verifies that the sink device 1490 is a member of the user's managed domain, that the sink device 1490 is DTCP-IP enabled and that the usage rules 1426, including the Selectable Output Control, and Content Usage Information allow the content to be consumed by the sink device 1490. The Host device 1440 also verifies that DTCP-IP link layer protection is sufficient to provide the content protection required by the usage rules 1426.

The Host device 1440 exchanges a content scrambling key with the sink device 1490 under the robustness rules applicable to DTCP-IP link layer protection. The Host device 1440 provides the usage rules 1426 and the Content Usage Information applicable to this content to the CPMS Client 1494 on the sink device.

The Host device 1440 descrambles the content that it has acquired from the Conditional access control device 1444 or as CPMS scrambled content directly from the CPMS encryption system 1422, and rescrambles the content for distribution to the sink device 1490 within the preferred domain. The Host device 1440 may modify the CCI bits for Copy Once content to Copy No More, if this is required by the usage rules 1426.

The Host device 1440 updates its Content Usage Information to indicate that the content is being consumed by the sink device 1490. At the end of content play, the Host device 1440 may update the Content Usage Information to indicate that the content is no longer being consumed by the managed device 1490. The sink device 1490 descrambles the content and renders the content to the viewer 1492.

FIG. 14 also illustrates the consumption of content under managed CPMS scrambling. In this case, the sink device 1490 does not support DTCP-IP. Such a device may be a computer that has a CPMS Client installed or the usage rules 1426 do not allow delivery of content over DTCP-IP. The Host device 1440 verifies that the sink device 1490 is a member of the user's managed domain and that the usage rules 1426, including the Selectable Output Control, and Content Usage Information allow the content to be consumed by the sink device 1490. It is assumed that the verification process provides sufficient information about the sink device 1490 to assess its capabilities.

The Host device 1440 exchanges a content scrambling key with the sink device 1490 under the robustness rules applicable to the CPMS. If the content has been acquired directly from the CPMS encryption system 1422, this should be the scrambling key for that content; otherwise, a new content scrambling key is used.

If the content has been acquired from the Conditional access control device 1444, the Host device 1440 descrambles and rescrambles the content for distribution to the sink device 1490 within the preferred domain. The Host device 1440 securely provides usage rules to the sink device 1490. The Host device 1440 may modify the CCI bits for Copy Once content to Copy No More, if this is required by the usage rules 1426. The Host device 1440 manages Content Usage Information and may include directives to the sink device 1490 that require it validate such information before forwarding the content for consumption on another device.

The Host device 1440 updates its Content Usage Information to indicate that the content is being consumed by the sink device 1490. At the end of content play, the Host device 1440 may update the Content Usage Information to indicate that the content is no longer being consumed by the sink device 1490. The sink device 1490 descrambles the content and renders the content to the viewer 1492.

Still further, FIG. 14 also illustrates the consumption of content limited to a local domain. In this case, the usage rules 1426 limit the rendering of content to devices that are in the same locality as the Host device 1440. The Host device 1440 verifies that the sink device 1490 is a member of the user's managed domain and that the usage rules 1426, including the Selectable Output Control, and Content Usage Information allow the content to be consumed by the sink device 1490. It is assumed that the verification process provides sufficient information about the sink device 1490 to assess its capabilities.

The Host device 1440 performs a proximity test to validate that the sink device 1490 is attached to the local network addressable from the Host device 1440. The form of proximity test needs to be defined for the managed CPMS and may include knowledge of the protocols used in content transfer and measurement of round trip times for specific data packets transmitted from source to sink device 1490. Proximity tests may need to be conducted periodically during content transmission to identify mobile devices that move away from the local domain.

FIG. 14 also illustrates the consumption of content limited by CUI directives. In this case, the usage rules limit the rendering of content to a particular period of time or place it under the control of a subscription or one time payment. For example, a recorded show may only be freely viewed for a period of seven days after it has been broadcast, or a live show may only be concurrently rendered to multiple devices on subscription to enhanced service programs.

The Host device 1440 verifies that the sink device is a member of the user's managed domain and that the usage rules 1426, including the Selectable Output Control, and the derived Content Usage Information allow the content to be consumed by the sink device 1490. The Host device 1440 verifies that the time constraints expressed in the CUI have been met. This assumes that the Host device 1440 has access to secure time and is regularly correlating its real time clock against the secure time source.

The Host device 1440 verifies the subscription status of the user against the usage rules 1426. This may require the Host device 1440 to access service subscription information from the headend at defined intervals.

Figure 15:
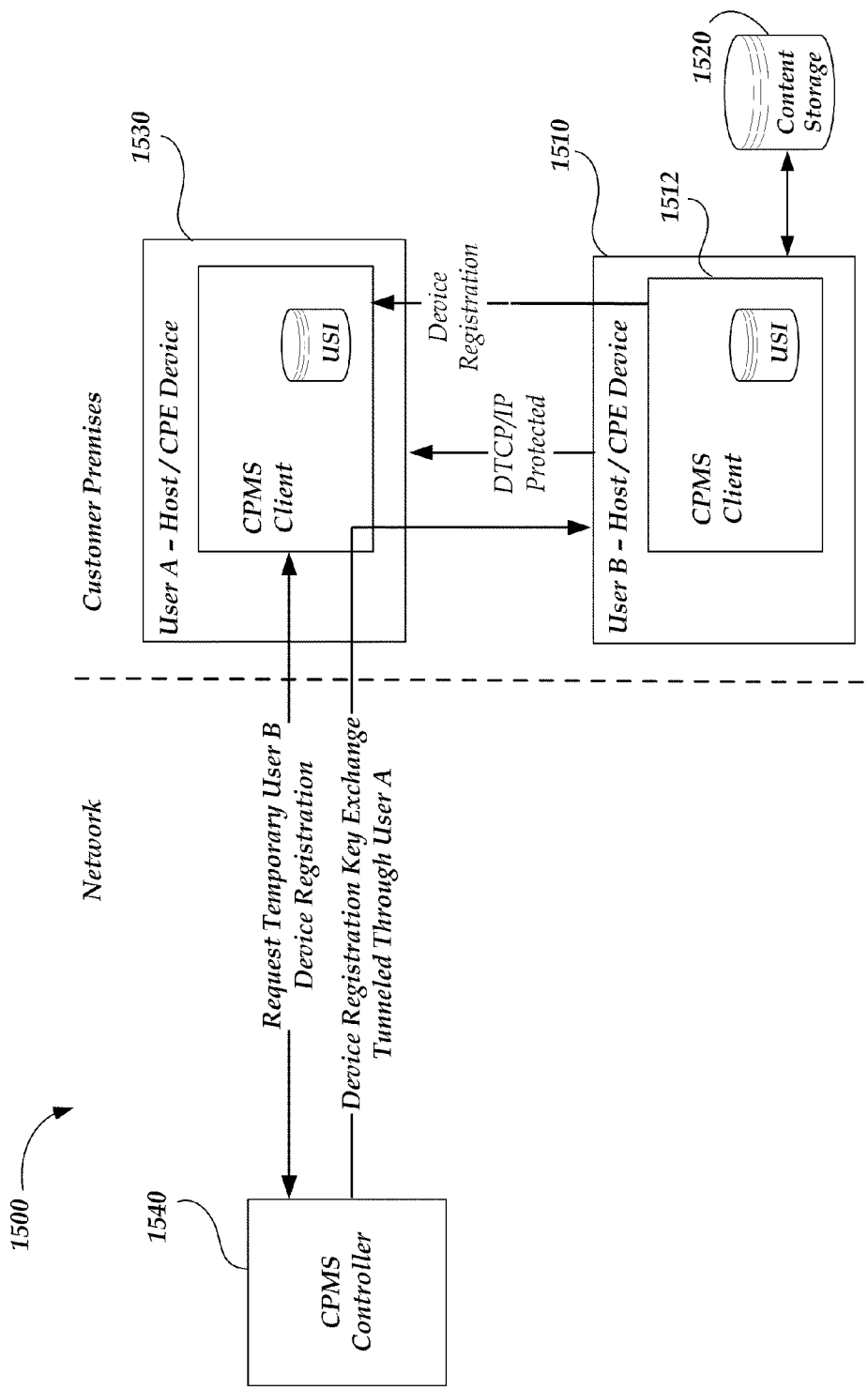
FIG. 15 illustrates content exchange between different domains according to an embodiment of the invention.

FIG. 15 illustrates content exchange between different domains 1500 according to an embodiment of the invention. FIG. 15 shows User B 1510 having stored content 1520 and its associated usage rules per the CPMS client 1512 on a portable device registered to its managed domain. The usage rules provided by the CPMS client 1512 allow one copy to be stored on a single device within this domain.

User A 1530 also subscribes to services and has a distinct managed user domain. User A 1530 missed a live show, but knows that User B 1510 recorded the broadcast. User B 1530 connects the source device 1510 containing the recorded show to the domain of User A 1530 and requests the CPMS controller 1540 to provide a temporary registration to that domain. The CPMS controller 1540 grants a time limited registration for the source device 1510 to the domain of User A 1530.

The source device 1510 exchanges and verifies credentials with the sink device 1530. The content is moved or consumed as described above. This use case assumes that the usage rules provide restriction on content that cannot be moved or rendered under a temporary registration. If these restrictions can be described in the usage rules, the temporary registration will not need to be aware of individual pieces of content.

Figure 16:
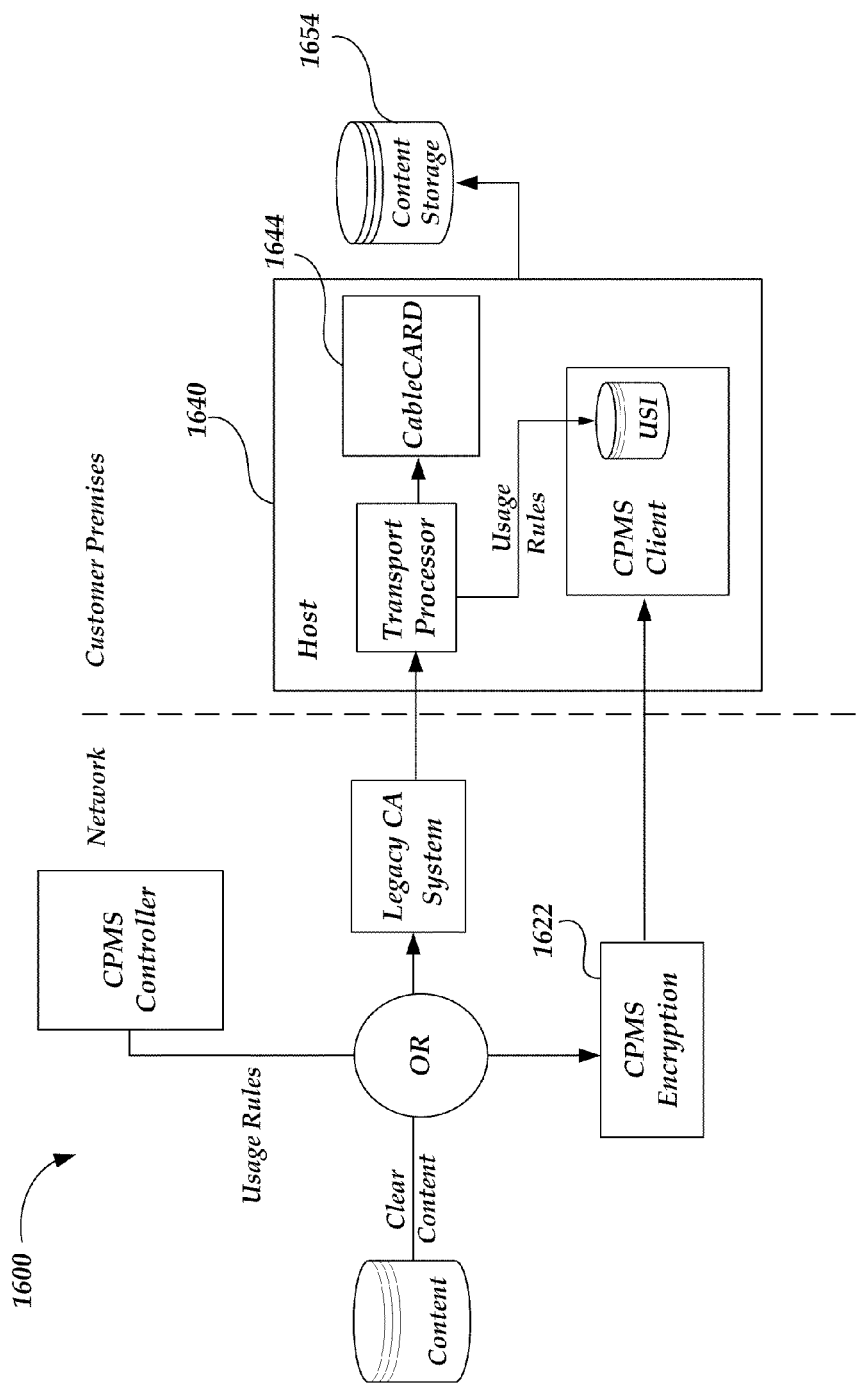
FIG. 16 illustrates the storage of content on the Host/CPE device according to an embodiment of the invention.

FIG. 16 illustrates the storage of content on the Host/CPE device 1600 according to an embodiment of the invention. In FIG. 16, content is stored on a Host device 1640 that provides a DVR capability and equates to the currently available DVR device content storage capabilities. The Host device 1640 verifies that the CCI bits in the transport stream allow the copying of content. The Host device 1640 also verifies that the selectable output controls allow storage to the selected storage device/media 1654.

The Host device 1640 receives content, either in the clear or copy protected, from the conditional access control device 1644 or directly from the CPMS encryption system 1622 and modifies the CCI bits in the transport stream for Copy Once content to indicate that this content is Copy No More.

The Host device 1640 stores the content, its associated metadata, its usage rules, Content Usage Information and scrambling keys. The standard DVR functions are used to examine and present stored content metadata to the user and to select content for replay.

The Content Usage Information supplied with the stored content can define restrictions on the future consumption, storage and exporting of that content. For example, the CUI could restrict the number of concurrent consumptions for a piece of content, the number of times the content can be played or the viewing window for the content, either as specific date range or as an elapsed period from time of storage, or from time of first viewing.

Figure 17:
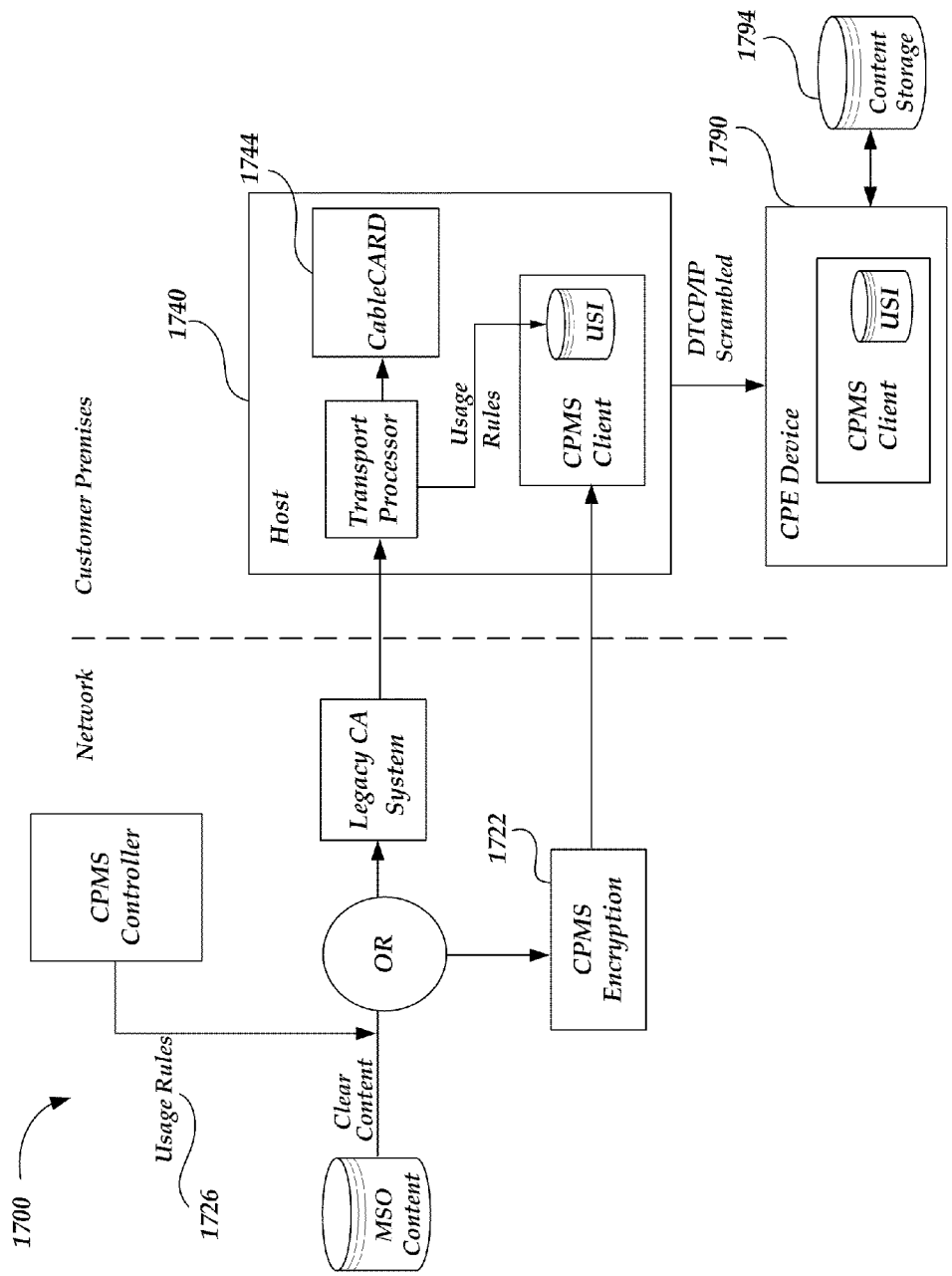
FIG. 17 illustrates the storage of content on a device in a managed domain according to an embodiment of the invention.

FIG. 17 illustrates the storage of content on a device in a managed domain 1700 according to an embodiment of the invention. In FIG. 17, content is distributed to other sink devices 1790 within the managed user's domain. The managed user's domain may be subdivided into a local domain for devices that are connected to the conditional access enabled Host device 1740, a geographically restricted domain for devices that are mobile where content consumption is limited by geographic constraints, or a "world-wide" domain that is unrestricted by geographic constraints.

Content originally acquired from through Conditional access control device 1744 is no longer coupled to the Conditional access control device 1744 and the scrambling keys are associated with the managed domain. This case is a CPMS only use case. DTCP alone is not sufficient to manage advanced content usage models such as consumption counts. The Host device 1740 verifies that the sink device 1790 is accessible from the managed domain and also checks that the usage rules 1726 associated with the content allow content storage on the sink device 1790.

The Host device 1740 verifies that the CCI bits in the transport stream allow the copying of content. The Host device 1740 also verifies that the selectable output controls allow storage to the selected storage device/media 1794. The Host device 1740 and the sink device 1790 exchange a content scrambling key according to the robustness rules for CPMS. The content key may also be encrypted with a master key so as to allow transfer of the content into another managed domain upon authorization of the CPMS to make such a transfer.

The Host device 1740 receives content, either in the clear or copy protected, from the Conditional access control device 1744 or directly from the CPMS encryption system 1922 and modifies the CCI bits in the transport stream for Copy Once content to indicate that this content is Copy No More.

The Host 1740 or CPE 1790 device delivers the content using DTCP/IP, associated metadata and usage rules. The Host 1740 or CPE 1790 device encrypts content metadata using the content transfer authorization key and, possibly, with the master key. The content transfer authorization key is used to allow scrambled content to be stored on back-up media and recovered to a different device in the case that the original device fails or is swapped out.

The CPE device 1790 scrambles the content received over the DTCP/IP link using local scrambling keys in accordance with CPMS robustness rules. The CPE device 1790 stores the scrambled content and the content metadata and local scrambling keys encrypted with the content transfer authorization key.

The stored content can only be descrambled by the sink device 1790 which securely holds the content scrambling key. That sink device 1790 could move the content to another device in the managed domain subject to the constraints in the usage rules 1726. However, the move operation would involve an exchange of encrypted content metadata and content transfer authorization keys to associate it with the receiving device.

Where the usage rules 1726 allow for the content to be stored or rendered to any device in the domain, the content could be scrambled using a content key that is accessible to all devices in the domain, i.e., a user's domain key managed within the CPMS. The master key may be a content specific key that enables the scrambled content to be moved to a new device. The new device can recover the master key from the headend and use this to recover the content scrambling key independently from the sink device 1790 that originally stored the scrambled content.

The Host device 1740 updates its Content Usage Information to indicate that a copy has been made to a device in the user's managed domain. The DVR functions are extended to aggregate content metadata across devices in the user's managed domain. The user can select content from these different devices for playback or move content between accessible devices to maximize use of available storage 1794.

In addition content may be moved or copied between devices in the same managed domain. This case describes the user managed movement or copying of content stored on one managed device 1740 to another managed device in the same user domain. The source device 1740 verifies that the sink device 1790 is accessible from the managed domain and also checks that the Content Usage Information associated with the content allow content storage on the sink device 1790. If the content is being copied the Copy Control Information within the content is examined and its rules are enforced.

If the content is scrambled with a device specific key, the source device and the sink device 1790 exchange a content scrambling key according to the robustness rules for CPMS. The source device descrambles and rescrambles the content to the freshly exchanged content key. The source device 1740 transmits the rescrambled content and the usage rules 1726 to the sink device 1790. If required by the robustness rules for the CPMS, the source device indicates to the Host device 1740 that the content has been moved to another managed device. The Host device 1740 can use this information to update its Content Usage Information.

If content watermarking is introduced, the content may include watermarking data that indicates each client device on which it has been stored since receipt. Watermarking should provide evidence of the chain of devices that have handled the content during its journey from the origination point to the device which now stores the content. If the content is being moved, the Host device 1740 removes the content and the metadata from its storage and indicates that it no longer stores this content to the DVR functions. There may be a need for a transaction based exchange between the Host device 1740 and sink devices 1790 to facilitate a move and to ensure that the two devices do not each contain an accessible copy of the content.

If the content is being copied, the Host device 1740 updates its CUI to indicate that a copy has been provided to the sink device 1790. The original content copy on the source could CCI bits that show Copy Once. The Host device 1740 could change these to indicate that the content is Copy No More or could rely on the updated CUI associated with the content to limit further copying.

Figure 18:
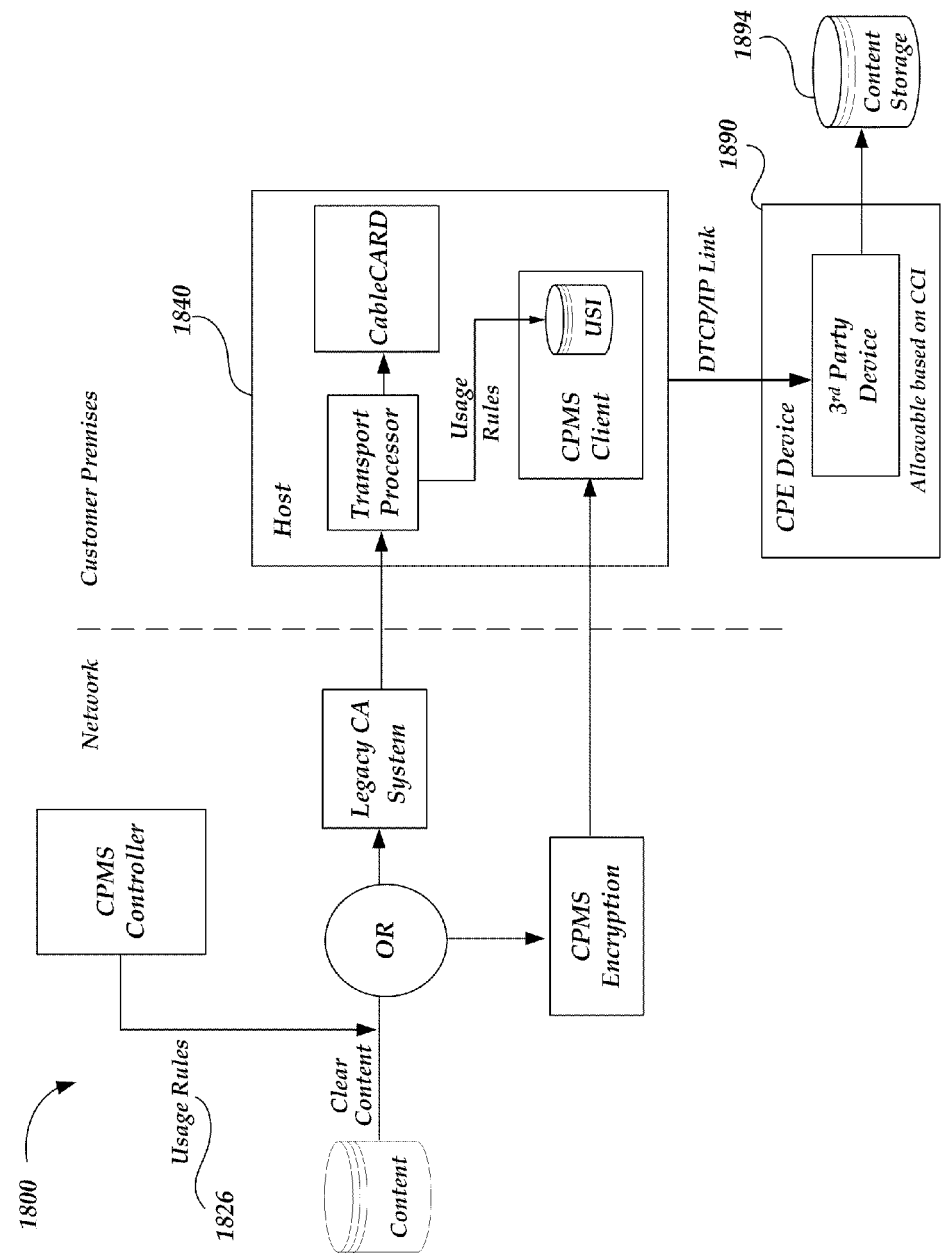
FIG. 18 illustrates content being exported to a DTCP-IP device according to an embodiment of the invention.

FIG. 18 illustrates content being exported to a DTCP-IP device 1800 according to an embodiment of the invention. FIG. 18 shows the copying or movement of content to a device that is not a member of the user's managed domain. After the move or copy function completes the content is no longer governed by the managed domain, but may be covered by a CPMS license applicable to the domain in which the content now resides. The usage rules 1826 and derived CUI can allow or restrict the export of content to those devices that are DTCP-IP enabled.

In FIG. 18, content is moved to a DTCP-IP enabled device 18 that provides storage 1894 for that content. It is assumed that the DTCP-IP enabled device 1890 is not registered to the managed domain. The source device 1840 in the managed domain is assumed to be DTCP-IP enabled. The source device 1840 exchanges and verifies DTLA certificates with the sink device 1890. The DTLA may include some device information in the certificate that can be used to assess the capabilities of the sink device 1890.

The source device 1840 verifies that the usage rules 1826 allow the copying or movement of content to the sink device 1890. If the content is to be copied, the CCI bits for the content of source device 1840 need to indicate Copy Freely or Copy Once. If the content is to be moved, these CCI bits need to indicate Copy Freely, Copy Once or Copy No More.

The Host device 1840 verifies that the current Content Usage Information allows copying or movement to the DTCP-IP sink device 1890. The source device 1890 exchanges DTCP-IP content scrambling keys with the sink device 1890. The source device 1840 descrambles the content, if it is not currently in the clear, and, if the content is being copied, changes the CCI bits to indicate that Copy Once content is now Copy No More. The source device 1840 generates the appropriate EMI for the content according to the DTCP-IP specification and rescrambles the content with the DTCP-IP content scrambling keys.

If the content is being moved, the source device 1840 removes the content and the metadata and indicates that it no longer has the content to DVR functions. If the content is being copied, the source device 1840 updates its CUI to indicate that a copy has been provided to the sink device 1890. The original content copy on the source device 1840 could have CCI bits that show Copy Once. The source device 1840 could change these to indicate that the content is Copy No More or could rely on the updated CUI associated with the content to limit further copying.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system providing content delivery to devices over a managed multimedia home network, comprising:
   a domain manager for receiving content, wherein the domain manager includes a first and second conditional access device and a security application; and
   a managed client device, coupled to and registered with the domain manager, the managed client device running a security application, the managed client device communicates with the security application in the domain manager;
   wherein the security application of the domain manager and the security application of the managed client instantiate device authentication and content usage rules as an overlay on top of any other content protection scheme; and
   wherein the domain manager descrambles and rescrambles the content for distribution to the managed client device and provides the usage rules to the managed client device when the content is acquired from the conditional access device.

2. The system of claim 1, wherein the domain manager further comprises a hard disk drive (HDD) for storing content therein.

3. The system of claim 1, wherein the security application of the domain manger includes an encryption engine and provides metadata to describe the content and a set of security rules.

4. The system of claim 1, wherein the security application of the domain manger is configured to provide a single managed content protection infrastructure with a common set of policies.

5. The system of claim 1, wherein the domain manager and the managed client device implement a DTCP protocol for providing protection of content in a home network.

6. The system of claim 1, wherein the first conditional access device re-encrypts and maps rights into the domain of the security application.

7. The system of claim 1, wherein the security application protects content according to usage rules provided with content.

8. The system of claim 1, wherein the domain manager determines whether the managed client device is a DTCP enabled device and, when the managed client device is a DTCP enabled device provide link protection between the domain manager and the managed client device.

9. The system of claim 1, wherein the domain manager verifies that the managed client device is a member of the managed domain and that the usage rules allow the content to be consumed by the managed client device.

10. The system of claim 1, wherein the domain manager provides a key to the managed client device for descrambling content provided to the managed client device.

11. The system of claim 1 further comprising a non-managed device, the non-managed device implements DTCP but does not run a security application.

12. A method for providing content delivery to devices over a managed multimedia home network, comprising:
receiving content at a domain manager, wherein the domain manager includes a first and second conditional access component and a security application;
requesting content from the domain manager by a managed client device that is coupled to and registered with the domain manager, wherein the managed client device runs a security application, the managed client device communicates with the security application in the domain manager;
instantiating device authentication and content usage rules as an overlay on top of any other content protection using the security application of the domain manager and the security DRM application client of the managed client; and
wherein the domain manager descrambles and rescrambles the content for distribution to the managed client device and provides the usage rules to the managed client device when the content is acquired from the conditional access device.

13. The method of claim 12, wherein the receiving content at the domain manager further comprises receiving content from a content provider configured with content usage information.

14. The method of claim 12, wherein the requesting content from the domain manager by a managed client device that is coupled to and registered with the domain manager further comprises:
negotiating between the domain manager and the managed client at the DTCP level;
authenticating between the security application of the managed client and the security application of the domain manger;
providing only non-managed content and content based on CCI authorization to a non-managed client device; and
providing managed content to a managed client device that passes the authentication between the security application of the managed client and the security application of the domain manger.

15. The method of claim 12, wherein instantiating device authentication and content usage rules as an overlay on top of any other content protection further comprises verifying that the managed client device is a member of the managed domain and that the usage rules allow the content to be consumed by the managed client device.

16. A computer readable device including executable instructions which, when executed by a processor, provides content delivery to devices over a managed multimedia home network, by:
receiving content at a domain manager, wherein the domain manager includes a first and second conditional access component and a security application;
requesting content from the domain manager by a managed client device that is coupled to and registered with the domain manager, wherein the managed client device runs a security application, the managed client device communicates with the security application in the domain manager;
instantiating device authentication and content usage rules as an overlay on top of any other content protection using the security application of the domain manager and the security DRM application client of the managed client; and
wherein the domain manager descrambles and rescrambles the content for distribution to the managed client device and provides the usage rules to the managed client device when the content is acquired from the conditional access device.

17. The computer readable device of claim 16, wherein the receiving content at the domain manager further comprises receiving content from a content provider configured with content usage information.

18. The computer readable device of claim 16, wherein the requesting content from the domain manager by a managed client device that is coupled to and registered with the domain manager further comprises:
negotiating between the domain manager and the managed client at the DTCP level;
authenticating between the security application of the managed client and the security application of the domain manger;
providing only non-managed content and content based on CCI authorization to a non-managed client device; and
providing managed content to a managed client device that passes the authentication between the security application of the managed client and the security application of the domain manger.

19. The computer readable device of claim 16, wherein instantiating device authentication and content usage rules as an overlay on top of any other content protection further comprises verifying that the managed client device is a member of the managed domain and that the usage rules allow the content to be consumed by the managed client device.

* * * * *